(12) United States Patent
Park et al.

(10) Patent No.: US 12,229,998 B2
(45) Date of Patent: Feb. 18, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Jaesung Park, Suwon-si (KR); Jiman Kim, Suwon-si (KR); Junhee Woo, Suwon-si (KR); Seongwoon Jung, Suwon-si (KR); Junghwa Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 17/583,605

(22) Filed: Jan. 25, 2022

(65) Prior Publication Data

US 2022/0343541 A1     Oct. 27, 2022

Related U.S. Application Data

(63) Continuation of application No. PCT/KR2022/000018, filed on Jan. 3, 2022.

(30) Foreign Application Priority Data

Apr. 22, 2021  (KR) .................. 10-2021-0052220
Oct. 27, 2021  (KR) .................. 10-2021-0144246

(51) Int. Cl.
*G06T 7/90*      (2017.01)
*G06T 7/30*      (2017.01)
(Continued)

(52) U.S. Cl.
CPC ............. *G06T 7/90* (2017.01); *G06T 7/30* (2017.01); *G06V 10/56* (2022.01); *H04N 9/3111* (2013.01);
(Continued)

(58) Field of Classification Search
CPC ......... G06T 7/90; G06T 7/30; G06T 2200/24; G06T 2207/10024; G06T 2207/20068; G06V 10/56; H04N 9/3111; H04N 9/3182
See application file for complete search history.

(56) References Cited

U.S. PATENT DOCUMENTS 7,822,269 B2   10/2010  Tsukada
9,022,576 B2   5/2015   Jeong et al.
(Continued)

FOREIGN PATENT DOCUMENTS

JP     4120841       7/2008
JP     2012-068364   4/2012
(Continued)

OTHER PUBLICATIONS

Search Report and Written Opinion dated May 3, 2022 in counterpart International Patent Application No. PCT/KR2022/000018 and English-language translation.
(Continued)

*Primary Examiner* — Yassin Alata
(74) *Attorney, Agent, or Firm* — Nixon & Vanderhye, P.C.

(57) ABSTRACT

An electronic apparatus is disclosed. The electronic apparatus includes: a memory storing a first pattern image and a second pattern image, a communication interface comprising communication circuitry configured to communicate with an external terminal apparatus, a projection part including a projection lens, and a processor configured to: control the projection part to project the first pattern image on a screen member comprising a reflector located on a projection surface, and based on receiving a first photographed image which photographed the screen member from the external terminal apparatus through the communication interface, acquire transformation information based on the first photographed image and the first pattern image, control
(Continued)

the projection part to project the second pattern image on the projection surface, and based on receiving a second photographed image which photographed the projection surface from the external terminal apparatus through the communication interface, perform color calibration based on the characteristic of the projection surface based on the second photographed image, the second pattern image, and the transformation information.

16 Claims, 29 Drawing Sheets

(51) Int. Cl.
    *G06V 10/56*     (2022.01)
    *H04N 9/31*     (2006.01)

(52) U.S. Cl.
    CPC ....... *H04N 9/3182* (2013.01); *G06T 2200/24* (2013.01); *G06T 2207/10024* (2013.01); *G06T 2207/20068* (2013.01)

(56) References Cited

U.S. PATENT DOCUMENTS

| | | | |
|---|---|---|---|
| 10,080,004 | B2 | 9/2018 | Grundhofer |
| 10,225,464 | B2 | 3/2019 | Narikawa |
| 10,694,160 | B2 | 6/2020 | Tait et al. |
| 2003/0164927 | A1* | 9/2003 | Tsukada .................. H04N 9/64 348/E9.037 |
| 2003/0234785 | A1 | 12/2003 | Matsuda et al. |
| 2004/0140982 | A1* | 7/2004 | Pate .................. H04N 9/3182 345/600 |
| 2007/0110304 | A1 | 5/2007 | Tsukada |
| 2010/0171933 | A1 | 7/2010 | Kim et al. |
| 2013/0113975 | A1* | 5/2013 | Gabris .................. G03B 17/54 353/121 |
| 2017/0344543 | A1* | 11/2017 | Inata ................ H04N 21/25825 |
| 2018/0160086 | A1 | 6/2018 | Naganuma |
| 2019/0297306 | A1 | 9/2019 | Narikawa |

FOREIGN PATENT DOCUMENTS

| | | |
|---|---|---|
| JP | 2017-059903 | 3/2017 |
| KR | 10-0852664 | 8/2008 |
| KR | 10-0866882 | 10/2008 |
| KR | 10-2010-0081040 | 7/2010 |
| KR | 10-2011-0095556 | 8/2011 |
| KR | 10-2015-0054452 | 5/2015 |
| KR | 10-2018-0042030 | 4/2018 |

OTHER PUBLICATIONS

"Colorful Walls, No Screen, but Still Want a Projector? It's Possible!", Oct. 7, 2019 https://www.benq.com/en-us/knowledge-center/knowledge/colorful-office-walls-no-screen-but-still-want-a-projector-it.html, 4 pages.

Brown, "From RAW to sRGB and Back: Modeling the Onboard Camera Processing Pipeline", Tutorial #3 International Conference on Image Processing (ICIP'13), Sep. 15, 2013, 258 pages.

Extended Search Report dated Apr. 30, 2024 in European Patent Application No. 22791841.4.

Sadlo et al: "A practical structured light acquisition system for point-based geometry and texture", Point-based Graphics, 2005. Eurographics/IEEE VGTC Symposium Proceedings, IEEE, Jun. 21, 2005, 10 pages.

\* cited by examiner

FIG. 4

| CLASSIFICATION | SUBJECT ACQUIRING AN IMAGE | | METHOD OF USING THE SCREEN MEMBER | |
|---|---|---|---|---|
| | TERMINAL APPARATUS | ELECTRONIC APPARATUS | INSTALLATION BY USER | ACCOMMODATION INSIDE THE ELECTRONIC APPARATUS |
| FIRST EMBODIMENT | O | X | O | X |
| SECOND EMBODIMENT | O | X | X | O |
| THIRD EMBODIMENT | X | O | O | X |
| FOURTH EMBODIMENT | X | O | X | O |

FIG. 10
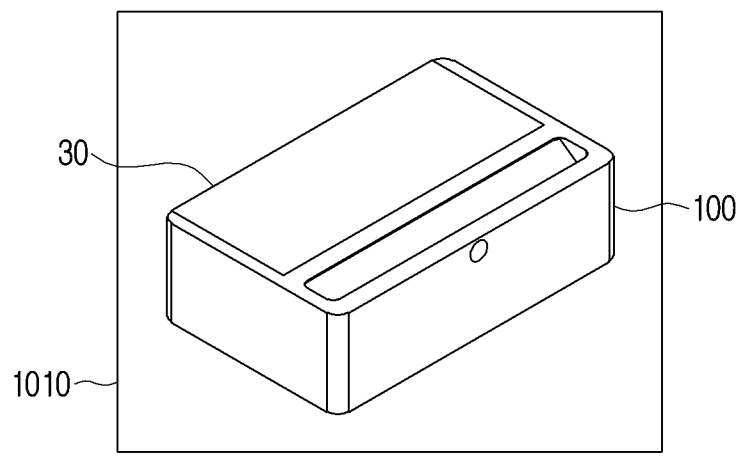
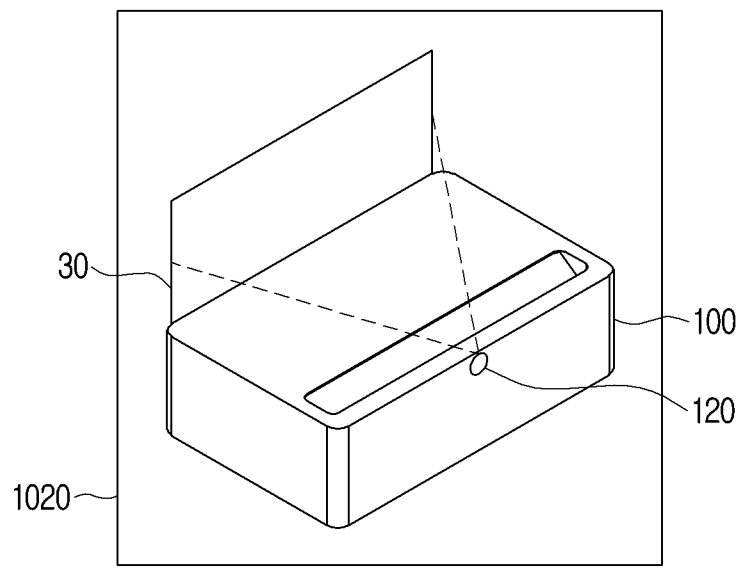
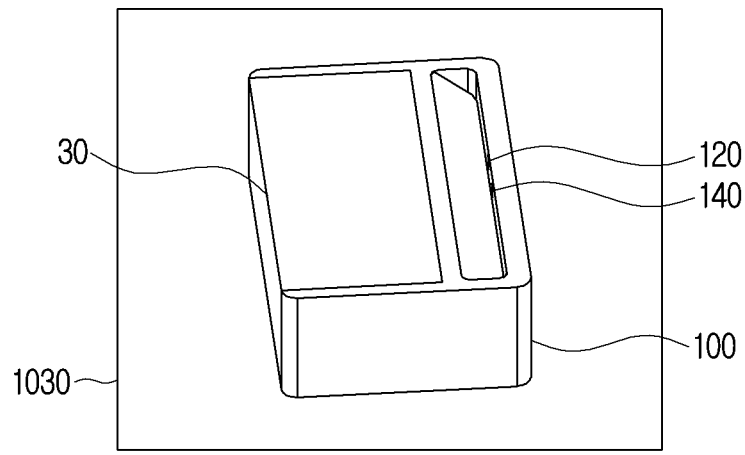

FIG. 11
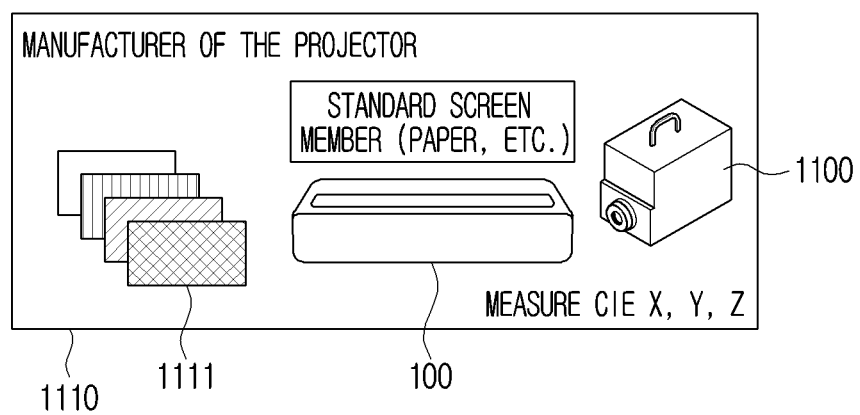
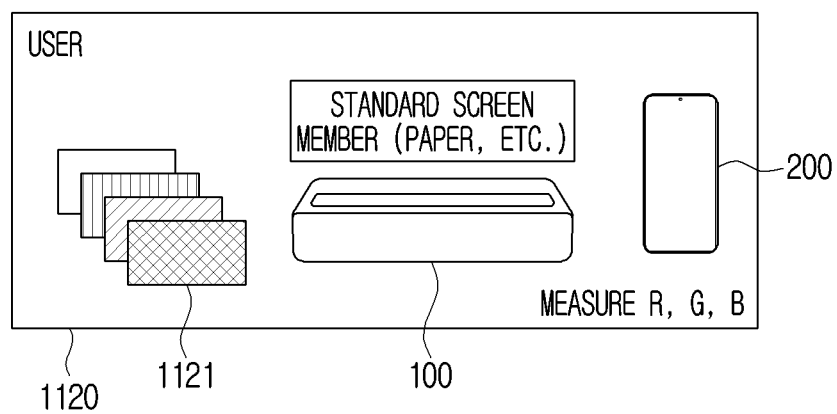

FIG. 14
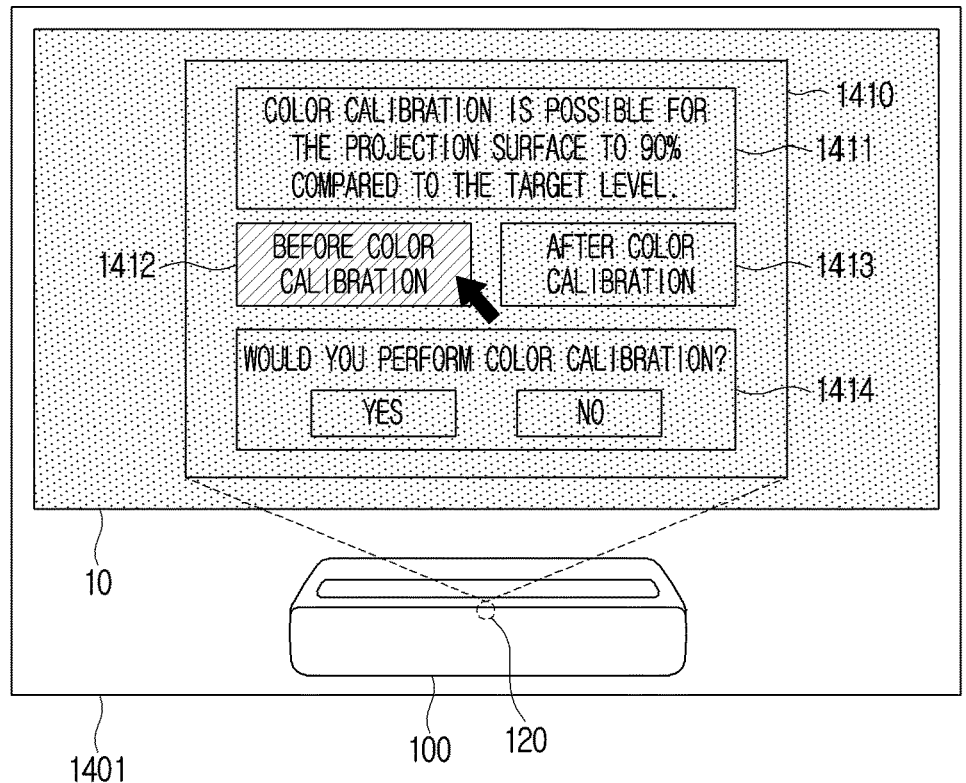
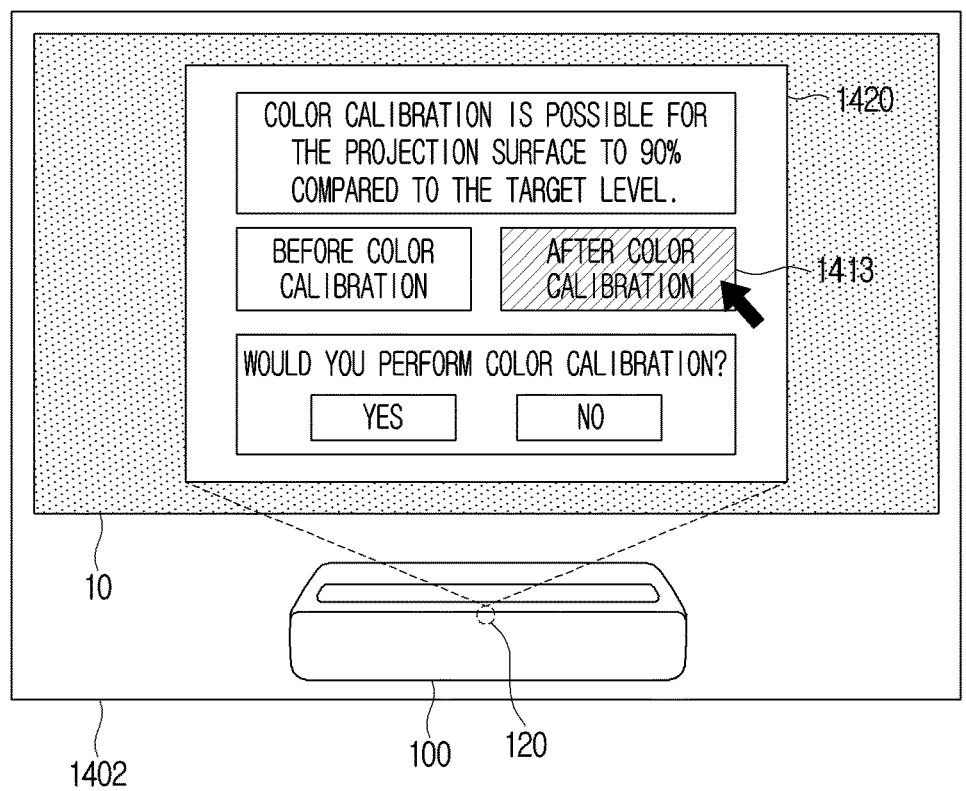

FIG. 16
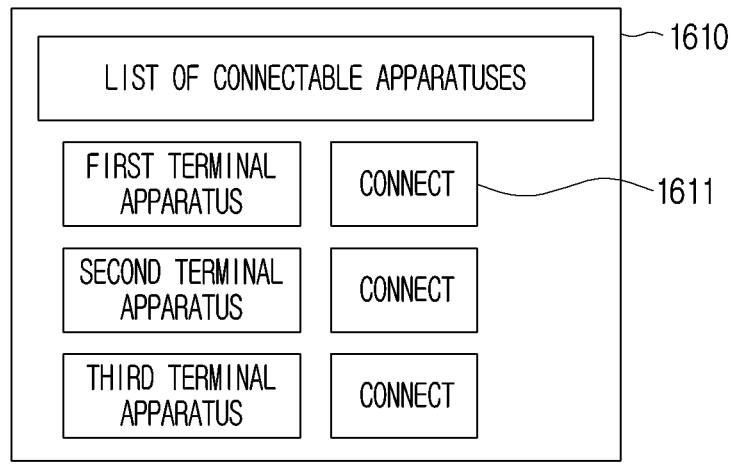
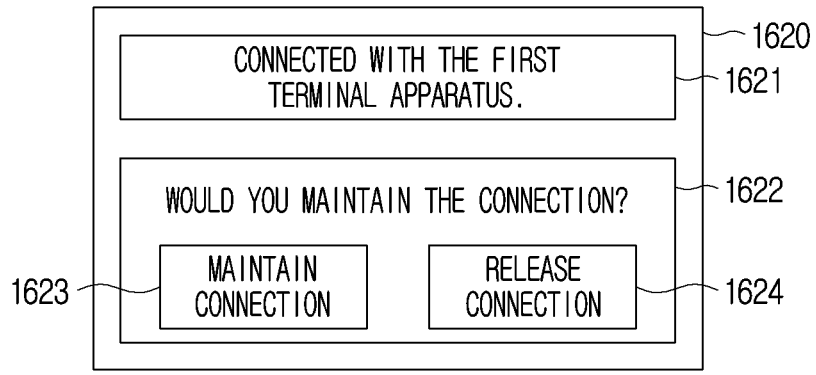
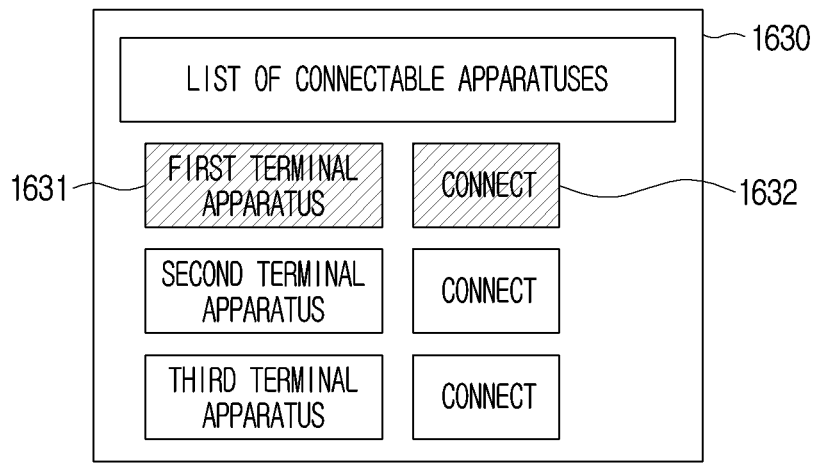

FIG. 21
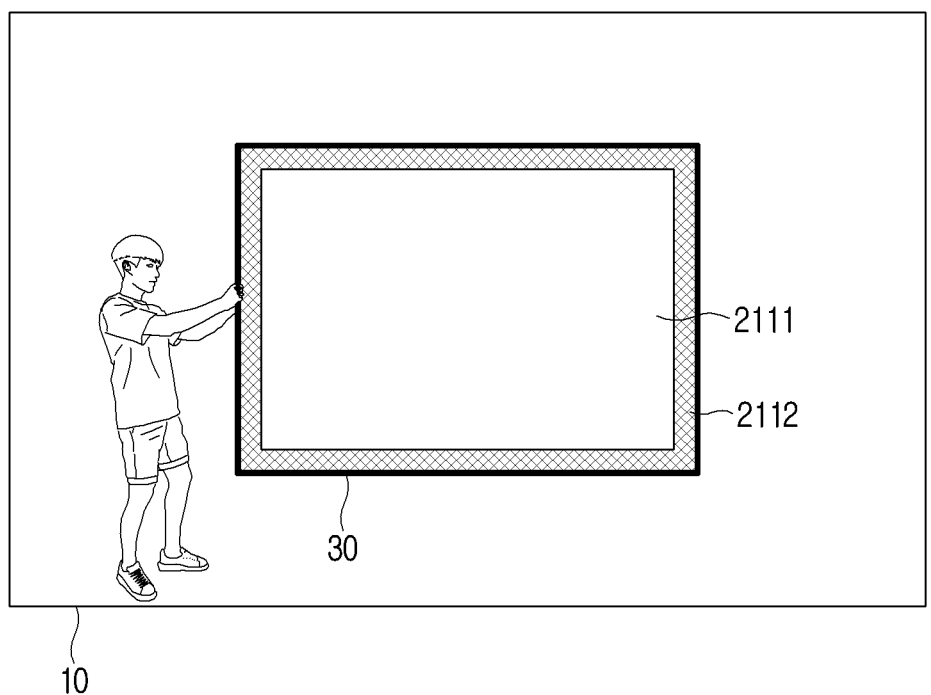
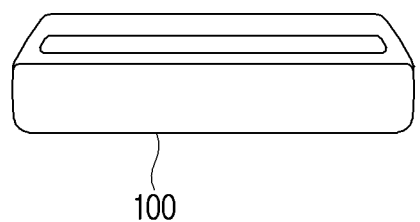

FIG. 22
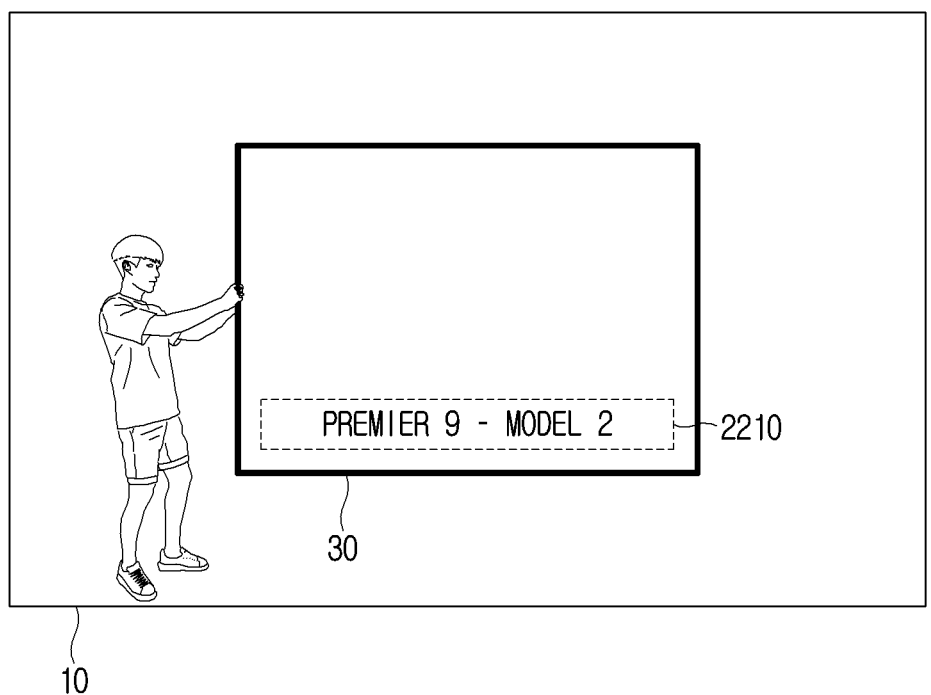
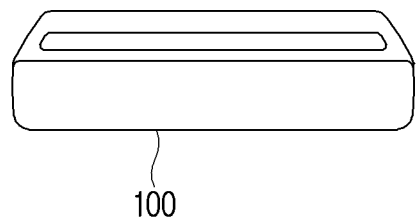

FIG. 27

$$\begin{pmatrix} KXR & KXG & KXB \\ KYR & KYG & KYB \\ KZR & KZG & KZB \end{pmatrix} * \begin{pmatrix} CCDR \\ CCDG \\ CCDB \end{pmatrix} = \begin{pmatrix} CCDX \\ CCDY \\ CCDZ \end{pmatrix} \quad \sim 2700$$

2701  2702  2703

$$\begin{pmatrix} KXR & KXG & KXB \\ KYR & KYG & KYB \\ KZR & KZG & KZB \end{pmatrix} * \begin{pmatrix} CCDRr \\ CCDGr \\ CCDBr \end{pmatrix} = \begin{pmatrix} SXr \\ SYr \\ SZr \end{pmatrix} \quad \sim 2710$$

2701  2712  2713

$$\begin{pmatrix} KXR & KXG & KXB \\ KYR & KYG & KYB \\ KZR & KZG & KZB \end{pmatrix} * \begin{pmatrix} CCDRg \\ CCDGg \\ CCDBg \end{pmatrix} = \begin{pmatrix} SXg \\ SYg \\ SZg \end{pmatrix} \quad \sim 2720$$

2701  2722  2723

$$\begin{pmatrix} KXR & KXG & KXB \\ KYR & KYG & KYB \\ KZR & KZG & KZB \end{pmatrix} * \begin{pmatrix} CCDRb \\ CCDGb \\ CCDBb \end{pmatrix} = \begin{pmatrix} SXb \\ SYb \\ SZb \end{pmatrix} \quad \sim 2730$$

2701  2732  2733

2810

|  | R | G | B |
|---|---|---|---|
| WHITE | 304.30 | 85.23 | 29.91 |
| RED | 54.99 | 659.09 | 175.93 |
| GREEN | 15.55 | 130.38 | 520.77 |
| BLUE | 379.21 | 876.41 | 733.54 |
| GRAY | 18.05 | 42.46 | 34.11 |

2820

|  | X | Y | Z |
|---|---|---|---|
| WHITE | 0.67 | 0.31 | 131.95 |
| RED | 0.26 | 0.67 | 462.75 |
| GREEN | 0.15 | 0.05 | 67.49 |
| BLUE | 0.27 | 0.27 | 681.45 |
| GRAY | 0.27 | 0.28 | 19.51 |

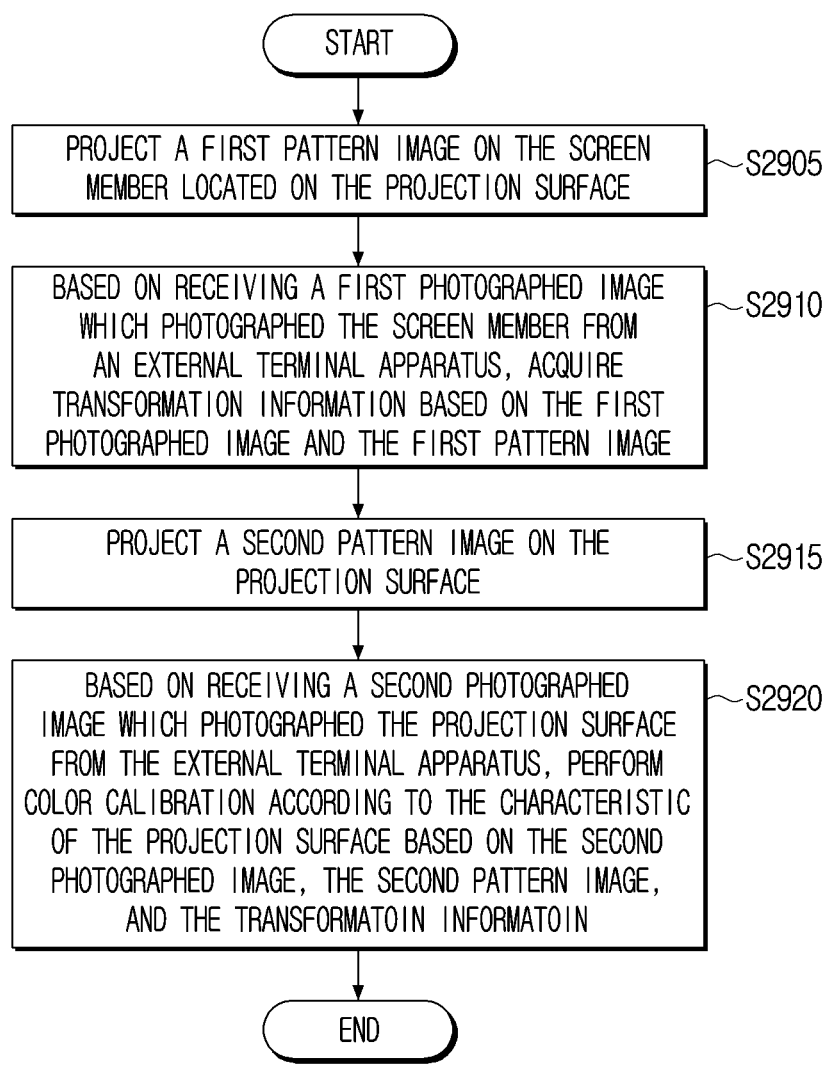

ELECTRONIC APPARATUS AND CONTROLLING METHOD THEREOF

CROSS-REFERENCE TO RELATED APPLICATIONS

This application is a continuation of International Application No. PCT/KR2022/000018 designating the United States, filed on Jan. 3, 2022, in the Korean Intellectual Property Receiving Office and claiming priority to Korean Patent Application No. 10-2021-0052220, filed on Apr. 22, 2021, in the Korean Intellectual Property Office and Korean Patent Application No. 10-2021-0144246, filed on Oct. 27, 2021, the disclosures of all of which are incorporated by reference herein in their entireties.

BACKGROUND

Field

The disclosure relates to an electronic apparatus including a projection part and a controlling method thereof, and for example, to an electronic apparatus that performs a color calibrating operation related to image projection, and a controlling method thereof.

Description of Related Art

In the case of an electronic apparatus projecting an image through a projection part (e.g., a projector), a specific surface such as a wall or a ceiling may be a screen. In the case of a screen which is not a dedicated screen, the color of the screen on which an image is projected may not be a standard white color. Accordingly, if the color of a screen is not a standard white color, there is a problem that the color of the original image is not displayed as it is. For example, it is assumed that the color of a screen is gray. In case a white image is projected on a gray projection surface, there is a possibility that a user may recognize the image as a light gray image, but not a white image.

Even if the color of a screen is white from a user's point of view, the color may not perfectly coincide with the standard white color. In the case of not using a dedicated screen, a problem that a user recognizes an image having a different color from the color of the original image may occur.

Even if a dedicated screen is used, a possibility that the color of the dedicated screen may be discolored as time passes may exist. Accordingly, a problem that a user recognizes an image of a different color from the color of the original image projected on the discolored projection surface may occur.

SUMMARY

Embodiments of the disclosure provide an electronic apparatus that outputs a pattern image to a screen member and acquires color space transformation information, and outputs the pattern image to a projection surface and performs color calibration appropriate for the projection surface, and a controlling method thereof.

An electronic apparatus according to an example embodiment of the disclosure includes: a memory storing a first pattern image and a second pattern image, a communication interface comprising communication circuitry configured to communicate with an external terminal apparatus, a projection part comprising a projector or image projecting lens, and a processor configured to: control the projection part to project the first pattern image on a screen member comprising a reflector located on a projection surface, and based on receiving a first photographed image which photographed the screen member from the external terminal apparatus through the communication interface, acquire transformation information based on the first photographed image and the first pattern image, control the projection part to project the second pattern image on the projection surface, and based on receiving a second photographed image which photographed the projection surface from the external terminal apparatus through the communication interface, perform color calibration based on the characteristic of the projection surface based on the second photographed image, the second pattern image, and the transformation information.

The transformation information may include color space transformation information, and the processor may be configured to: acquire color space information corresponding to the first pattern image, and acquire the color space transformation information according to the characteristic of the projection part based on the first photographed image and the color space information corresponding to the first pattern image.

The processor may be configured to: acquire color space information corresponding to the second pattern image, and perform color calibration according to the characteristic of the projection surface based on the second photographed image, the color space information corresponding to the second pattern image, and the color space transformation information.

The processor may be configured to: acquire the color space transformation information based on RGB information corresponding to the first photographed image and XYZ color space information corresponding to the first pattern image.

The transformation information may include a color space transformation matrix transforming the RGB information into the XYZ color space information.

The processor may be configured to: transform the RGB information corresponding to the second photographed image into the XYZ color space information based on the transformation information, acquire a color difference between the XYZ color space information corresponding to the second photographed image and the XYZ color space information corresponding to the second pattern image, and perform the color calibration based on the acquired color difference.

The processor may be configured to change at least one of a gain value or an offset value related to an RGB signal based on the acquired color difference.

The processor may, based on identifying that a predetermined object related to the screen member is included in the first photographed image, be configured to: acquire the transformation information based on the first photographed image, and based on identifying that a predetermined object related to the screen member is not included in the first photographed image, control the projection part to project a user interface (UI) including information that the screen member is not recognized.

The first pattern image may include at least one of a white pattern image, a red pattern image, a green pattern image, or a blue pattern image, and the second pattern image may include a white pattern image.

The processor may be configured to control the projection part such that the white pattern image among the plurality of pattern images included in the first pattern image is projected first, and the remaining pattern images are sequentially projected.

A method of controlling an electronic apparatus storing a first pattern image and a second pattern image and communicating with an external terminal apparatus according to an example embodiment of the disclosure includes: projecting the first pattern image on a screen member located on a projection surface, and based on receiving a first photographed image which photographed the screen member from the external terminal apparatus, acquiring transformation information based on the first photographed image and the first pattern image, projecting the second pattern image on the projection surface, and based on receiving a second photographed image which photographed the projection surface from the external terminal apparatus, performing color calibration according to the characteristic of the projection surface based on the second photographed image, the second pattern image, and the transformation information.

The transformation information may include color space transformation information, and the acquiring the transformation information may include, acquiring color space information corresponding to the first pattern image, and acquiring the color space transformation information according to the characteristic of a projection part included in the electronic apparatus based on the first photographed image and the color space information corresponding to the first pattern image.

The performing the color calibration may include, acquiring color space information corresponding to the second pattern image, and performing color calibration according to the characteristic of the projection surface based on the second photographed image, the color space information corresponding to the second pattern image, and the color space transformation information.

The acquiring the transformation information may include, acquiring the color space transformation information based on RGB information corresponding to the first photographed image and XYZ color space information corresponding to the first pattern image.

The transformation information may include a color space transformation matrix transforming the RGB information into the XYZ color space information.

The performing the color calibration may include, transforming the RGB information corresponding to the second photographed image into the XYZ color space information based on the transformation information, acquiring a color difference between the XYZ color space information corresponding to the second photographed image and the XYZ color space information corresponding to the second pattern image, and performing the color calibration based on the acquired color difference.

The performing the color calibration may include, at least one of a gain value or an offset value related to an RGB signal may be changed based on the acquired color difference.

The method may further include: based on identifying that a predetermined object related to the screen member is included in the first photographed image, acquiring the transformation information based on the first photographed image and the first pattern image, and based on identifying that a predetermined object related to the screen member is not included in the first photographed image, projecting a user interface (UI) including information that the screen member is not recognized.

The first pattern image may include at least one of a white pattern image, a red pattern image, a green pattern image, or a blue pattern image, and the second pattern image may include a white pattern image.

The projecting the first pattern image, includes projecting the white pattern image among the plurality of pattern images included in the first pattern image first, and projecting the remaining pattern images sequentially.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a table illustrating various examples of performing color calibrating operations according to various embodiments;

FIG. 10 is a diagram illustrating example operations of using a screen member according to various embodiments;

FIG. 11 is a diagram illustrating an example operation of generating a color space transformation matrix according to various embodiments;

FIG. 14 is a diagram illustrating an example operation of comparing projection before color calibration and projection after color calibration according to various embodiments;

FIG. 16 is a diagram illustrating an example operation of projecting information related to a terminal apparatus that can be connected with an electronic apparatus according to various embodiments;

FIG. 21 is a diagram illustrating an example operation of identifying a screen member according to various embodiments;

FIG. 22 is a diagram illustrating an example operation of identifying a screen member according to an various embodiments;

FIG. 27 is a diagram illustrating an example process of acquiring a color space transformation matrix used in acquiring XYZ color space information corresponding to a photographed image according to various embodiments;

FIG. 29 is a flowchart illustrating an example method of controlling an electronic apparatus according to various embodiments.

DETAILED DESCRIPTION

Figure 1:
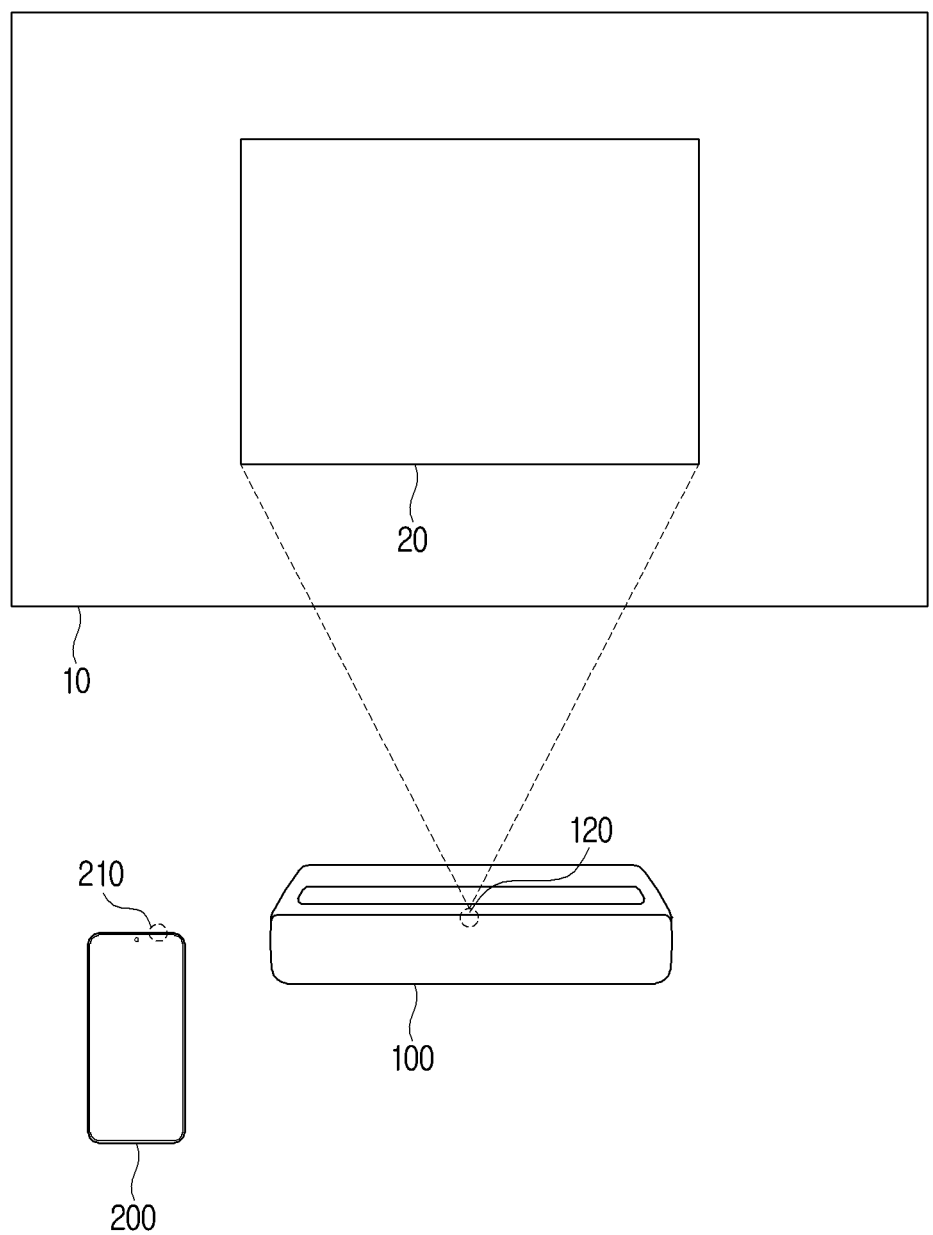
FIG. 1 is a diagram illustrating an example image projecting operation and an image photographing operation according to various embodiments.

Hereinafter, the disclosure will be described in greater detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent technical field or previous court decisions, emergence of new technologies, etc. Also, in particular cases, there may be arbitrarily selected terms, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In the disclosure, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to refer to any one of "A" or "B" or "A and B."

The expressions "first," "second" and the like used in this disclosure may be used to describe various elements regardless of any order and/or degree of importance. In addition, such expressions are used only to distinguish one element from another element, and are not intended to limit the elements.

The description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

In addition, singular expressions include plural expressions, as long as they do not conflict in context. In the disclosure, terms such as "include" and "consist of" should be construed as designating that there are such characteristics, numbers, steps, operations, elements, components, or a combination thereof described in the disclosure, but not as excluding in advance the existence or possibility of adding one or more of other characteristics, numbers, steps, operations, elements, components, or a combination thereof.

In the disclosure, "a module" or "a part" may perform at least one function or operation, and may be implemented as hardware or software, or as a combination of hardware and software. A plurality of "modules" or "parts" may be integrated into at least one module and implemented as at least one processor (not shown), except "modules" or "parts" which need to be implemented as specific hardware.

In the disclosure, the term "user" may refer to a person who uses an electronic apparatus or an apparatus using an electronic apparatus (e.g.: an artificial intelligence electronic apparatus).

Hereinafter, various example embodiments of the disclosure will be described in greater detail with reference to the accompanying drawings.

FIG. 1 is a diagram illustrating an example image projecting operation and an image photographing operation according to various embodiments.

The electronic apparatus 100 may refer, for example, to various apparatuses performing a function of a projector. The electronic apparatus 100 may include a projection part (e.g., projector) 120. The projection part 120 may refer, for example, to hardware projecting a specific image. For example, the projection part 120 may refer, for example, to an image projection lens which may be referred to hereinafter as, or may be used interchangeably with, the term projector.

The electronic apparatus 100 may project an image 20 on a screen 10 using the projection part 120.

A terminal apparatus 200 may photograph the projected image 20. The terminal apparatus 200 may include a camera 210. The terminal apparatus 200 may photograph the image 20 using the camera 210.

According to an embodiment, the terminal apparatus 200 may photograph a projection surface including the projected image 20. A user may photograph not only the area wherein the projected image 20 is projected, but also areas including the other areas. Accordingly, the electronic apparatus 100 may selectively use only the area wherein the projected image 20 is included in the photographed image photographed by the user.

According to an embodiment, the terminal apparatus 200 may photograph only the projected image 20. As information that is actually needed for color calibration is the part corresponding to the projected image 20, the user may photograph only the projected image 20. The electronic apparatus 100 may provide information for guiding the user to photograph only the projected image 20.

Figure 2:
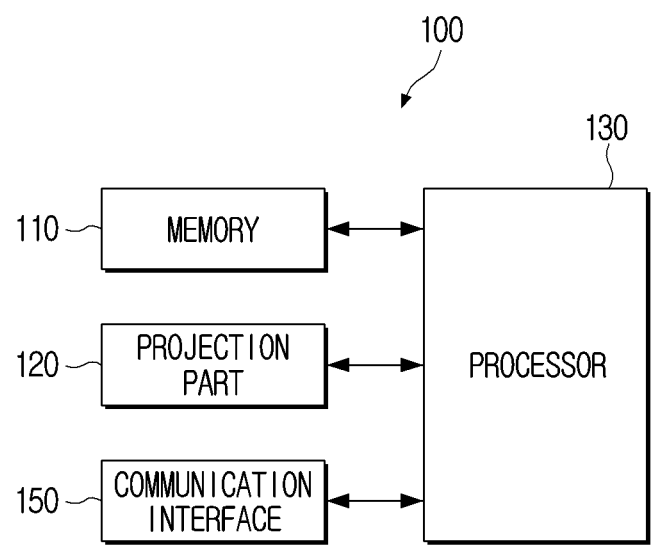
FIG. 2 is a block diagram illustrating an example configuration of an electronic apparatus according to various embodiments.

FIG. 2 is a block diagram illustrating an example configuration of the electronic apparatus 100 according to various embodiments.

Referring to FIG. 2, the electronic apparatus 100 may include at least one of a memory 110, a projection part (e.g., projector or projection lens) 120, a processor (e.g., including processing circuitry) 130 and/or a communication interface (e.g. including communication circuitry) 150.

In the memory 110, at least one instruction related to the electronic apparatus 100 may be stored. In the memory 110, an operating system (O/S) for driving the electronic apparatus 100 may be stored. In addition, in the memory 110, various kinds of software programs or applications for the electronic apparatus 100 to operate according to the various embodiments of the disclosure may be stored. The memory 110 may include a semiconductor memory such as a flash memory or a magnetic storage medium such as a hard disk, etc.

In the memory 110, various kinds of software modules for the electronic apparatus 100 to operate according to the various embodiments of the disclosure may be stored, and the processor 130 may control the operations of the electronic apparatus 100 by executing the various kinds of software modules stored in the memory 110. For example, the memory 110 may be accessed by the processor 130, and reading/recording/correcting/deleting/updating, etc. of data by the processor 130 may be performed.

The memory 110 may include a ROM (not shown) and a RAM (not shown) inside the processor 130, or a memory card (not shown) (e.g., a micro SD card, a memory stick) installed on the electronic apparatus 100.

The memory 110 may store information on a first pattern image and a second pattern image. For example, the memory 110 may store the first pattern image, RGB information corresponding to the first pattern image, color space information corresponding to the first pattern image (e.g., XYZ color space information), and color space information corresponding to the second pattern image (e.g., XYZ color space information).

The projection part 120 may include a projector or projection lens and output an image to be output from the electronic apparatus 100 to the projection surface. The projection part 120 may include a projection lens.

The projection part 120 may perform a function of outputting an image to the screen (or the projection surface). The projection part 120 is a component projecting an image to the outside. The projection part 120 according to an embodiment of the disclosure may be implemented in various projection methods (e.g., a cathode-ray tube (CRT) method, a liquid crystal display (LCD) method, a digital light processing (DLP) method, a laser method, etc.).

The projection part 120 may perform various functions for adjusting an output image by control by the processor 130. For example, the projection part 120 may perform functions such as zoom, keystone, quick corner (four corner) keystone, lens shift, etc.

The processor 130 may include various processing circuitry and perform overall controlling operations of the electronic apparatus 100. For example, the processor 130 performs a function of controlling the overall operations of the electronic apparatus 100.

The processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA). The processor 130 may perform various functions by executing computer executable instructions stored in the memory 110.

The processor 130 may control the projection part 120 to project the first pattern image on a screen member 30 (refer to FIG. 5) located on the projection surface, and if a first photographed image which photographed the screen member 30 is received from an external terminal apparatus through a communication interface 150, the processor 130 may acquire transformation information based on the first photographed image and the first pattern image, control the projection part 120 to project the second pattern image on the projection surface, and if a second photographed image which photographed the projection surface is received from the external terminal apparatus through the communication interface 150, the processor 130 may perform color calibration according to the characteristic of the projection surface based on the second photographed image, the second pattern image, and the transformation information.

The transformation information may include color space transformation information, and the processor 130 may acquire color space information corresponding to the first pattern image, and acquire the color space transformation information according to the characteristic of the projection part 120 based on the first photographed image and the color space information corresponding to the first pattern image. Here, the memory 110 may store the color space information corresponding to the first pattern image.

The processor 130 may acquire color space information corresponding to the second pattern image, and perform color calibration according to the characteristic of the projection surface based on the second photographed image, the color space information corresponding to the second pattern image, and the color space transformation information. The memory 110 may store the color space information corresponding to the second pattern image.

Figure 5:
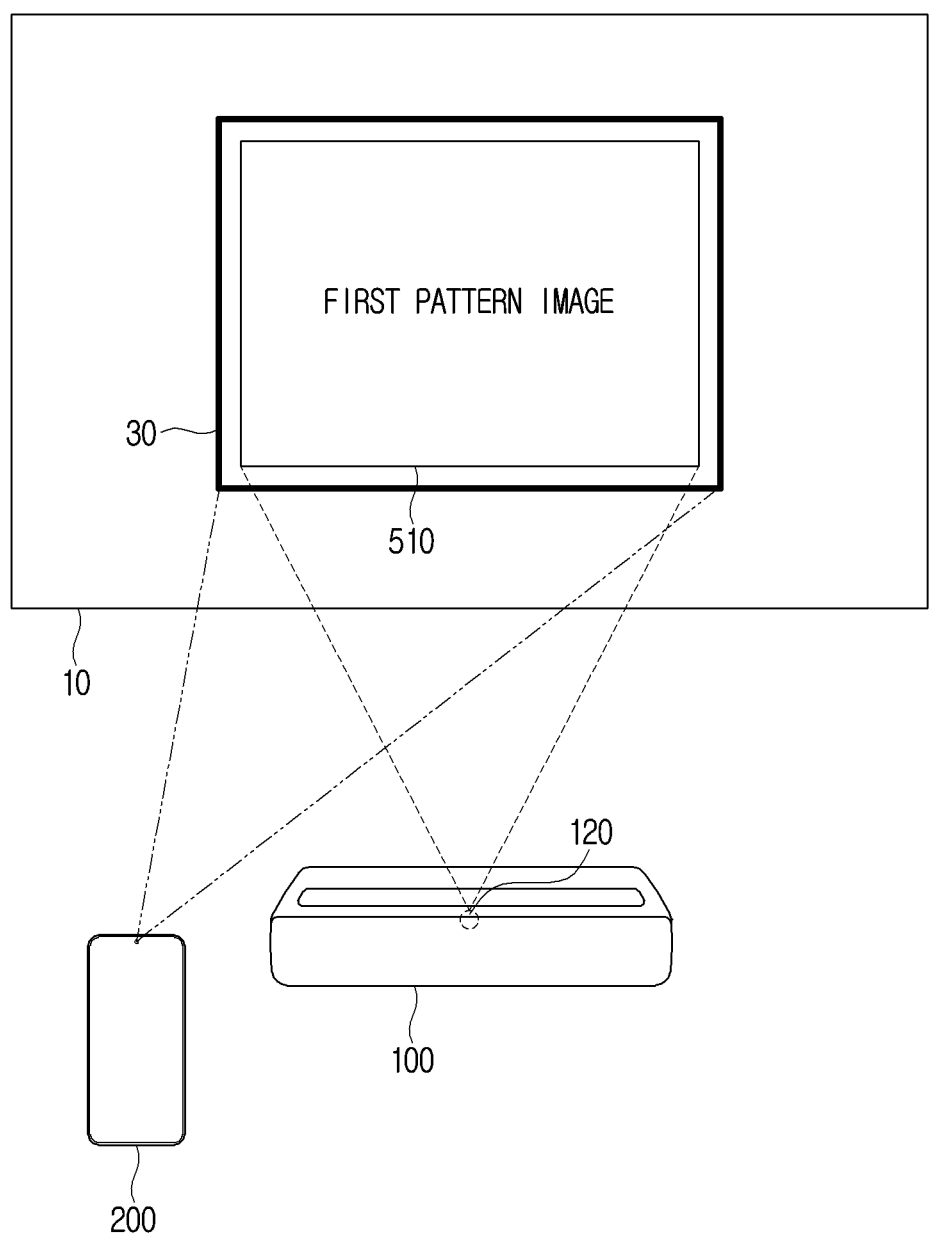
FIG. 5 is a diagram illustrating an example color calibrating operation according to various embodiments.

The processor 130 may control the projection part 120 to project the first pattern image on the screen member 30 (refer to FIG. 5). There may, for example, be two methods of using the screen member 30. As an example, the screen member 30 may be a member directly installed by a user. Explanation in this regard will be described in greater detail below with reference to FIG. 5 and FIG. 7. As another example, the screen member 30 may be a member included in (or attached on) the electronic apparatus 100. Explanation in this regard will be described in greater detail below with reference to FIG. 6 and FIG. 8.

The screen member 30 may refer, for example, to a white reflector, and it may refer, for example, to a reflector having the standard white color provided by the manufacturer of the electronic apparatus 100. When a reflector manufactured officially by the manufacturer of the electronic apparatus 100 is used, correct color space transformation information can be acquired. An operation of identifying whether an official (or a genuine) reflector is installed will be described in greater detail below with reference to FIG. 20 to FIG. 22. The screen member 30 may be described as an official reflector, a genuine reflector, a standard reflector, etc.

The screen member 30 may, for example, be a member satisfying at least one standard among the standard color, the standard specification, and the standard material. The screen member 30 may be a plane.

The first pattern image may be a test pattern image projected by the projection part 120. The first pattern image may include a white pattern image, a red pattern image, a green pattern image, and a blue pattern image, or the like.

For example, after the first pattern image is projected on the screen member 30, the processor 130 may acquire the first photographed image which photographed the screen member 30 on which the first pattern image is projected. The first photographed image may include the screen member 30 on which the first pattern image is projected. There may be various methods of acquiring a photographed image. As an example, a photographed image may be photographed by the camera of the terminal apparatus 200, and the electronic apparatus 100 may receive the photographed image from the terminal apparatus 200. Explanation in this regard will be described in greater detail below with reference to FIG. 5 and FIG. 6. As another example, a photographed image may be photographed by the camera attached on the electronic apparatus 100, and the processor 130 may acquire the photographed image by the camera of the electronic apparatus 100. Explanation in this regard will be described in greater detail below with reference to FIG. 7 and FIG. 8.

The characteristic of the projection part 120 may refer, for example, to a hardware attribute related to the projection part 120. For example, the characteristic of the projection part 120 may include information related to the performance of the projection lens included in the projection part 120. Accordingly, the color space transformation information may vary according to the hardware attribute of the projection part 120. The processor 130 may acquire color space transformation information appropriate for the projection part 120 based on the color space information corresponding to the first photographed image and the first pattern image.

The processor 130 may perform a pre-calibration operation using the white pattern image in the first pattern image. For example, the processor 130 may project the white pattern image on the screen member 30, and acquire a photographed image including the screen member 30 on which the white pattern image is projected (a photographed image including the white pattern image). The processor 130 may compare the photographed image including the white pattern image and the white pattern image (the original image), and adjust the sensitivity of the projection part 120. For example, the processor 130 may adjust a set value related to the performance of the projection lens included in the projection part 120. For example, the processor 130 may change a set value related to the shutter speed or the aperture.

The processor 130 may perform color calibration using the red pattern image, the green pattern image, and the blue pattern image in the first pattern image.

The processor 130 may project the red pattern image on the screen member 30, and acquire a photographed image including the screen member 30 on which the red pattern image is projected (a photographed image including the red pattern image). The processor 130 may compare the photographed image including the red pattern image and the red pattern image (the original image), and acquire at least one simultaneous equation related to the red pattern image.

The processor 130 may project the green pattern image on the screen member 30, and acquire a photographed image including the screen member 30 on which the green pattern image is projected (a photographed image including the green pattern image). The processor 130 may compare the photographed image including the green pattern image and the green pattern image (the original image), and acquire at least one simultaneous equation related to the green pattern image.

The processor 130 may project the blue pattern image on the screen member 30, and acquire a photographed image including the screen member 30 on which the blue pattern image is projected (a photographed image including the blue pattern image). The processor 130 may compare the photographed image including the blue pattern image and the blue pattern image (the original image), and acquire at least one simultaneous equation related to the blue pattern image.

The processor 130 may acquire color space transformation information (a color space transformation matrix) based on the at least one simultaneous equation related to the red pattern image, the at least one simultaneous equation related to the green pattern image, and the at least one simultaneous equation related to the blue pattern image.

Explanation related to the simultaneous equations will be described in greater detail below with reference to FIG. 27.

The processor 130 may acquire the color space transformation information based on information related to the first photographed image including the first pattern image projected on the screen member 30 and the first pattern image stored in the memory 110 in advance. The information related to the first pattern image may include the color space information corresponding to the first pattern image.

The color space transformation information may refer, for example, to a matrix for transforming general data into color space data.

The processor 130 may acquire the color space transformation information based on RGB information corresponding to the first photographed image and XYZ color space information corresponding to the first pattern image.

There may be various definitions defining the color space. Also, while XYZ was illustrated in the aforementioned description, other definitions of the color space may be used depending on implementation examples.

The color space transformation information may be a color space transformation matrix transforming the RGB information into the XYZ color space information. A specific operation of acquiring the color space transformation matrix will be described in greater detail below with reference to FIG. 17 and FIG. 18. A specific calculating operation of acquiring the color space transformation matrix will be described in greater detail below with reference to FIG. 27 and FIG. 28.

After the color space transformation matrix is acquired, the processor 130 may project the second pattern image on the screen 10. For example, after the color space transformation matrix is acquired, the processor 130 may project the second pattern image on the screen 10 wherein the screen member 30 does not exist. The processor 130 may acquire the first photographed image which photographed the screen member 30 and acquire the color space transformation matrix, and acquire the second photographed image which photographed the screen 10 wherein the screen member 30 is not arranged, and perform color calibration according to the projection surface. For example, for resolving the problem that the color of the original image is not expressed as it is due to the color of the screen 10, the processor 130 may photograph the screen 10 and perform color calibration. As a result, the processor 130 may output a projection image appropriate for the projection surface through color calibration. When the projection surface varies, color calibration may also vary.

As an example, the first pattern image and the second pattern image may be the same. The first pattern image and the second pattern image may be the same white pattern images. As another example, the first pattern image and the second pattern image may be different. The first pattern image may be one of the red pattern image, the green pattern image, or the blue pattern image, and the second pattern image may be the white pattern image.

The processor 130 may acquire the second photographed image which photographed the screen 10 in a state wherein the screen member 30 is not arranged. For resolving the problem that the color is distorted due to the color of the screen 10, the processor 130 may perform color calibration based on the second photographed image.

The processor 130 may acquire RGB information corresponding to the second photographed image.

The processor 130 may transform the RGB information corresponding to the second photographed image into the XYZ color space information based on the color space transformation information (e.g., the color space transformation matrix), acquire a color difference between the XYZ color space information corresponding to the second photographed image and the XYZ color space information corresponding to the second pattern image, and perform the color calibration based on the acquired color difference.

The processor 130 may change at least one of a gain value or an offset value related to an RGB signal based on the acquired color difference.

The processor 130 may change the gain value related to the RGB signal by performing a color calibrating operation. The gain value may refer, for example, to an element for adjusting the output value of the RGB signal through a multiplication (or a division) operation.

The processor 130 may change the offset related to the RGB signal by performing a color calibrating operation. The offset may refer, for example, to an element for adjusting the output value of the RGB signal through an addition (or a subtraction) operation.

If the output value of the RGB signal is adjusted, at least one of the luminance, the contrast, or the color of the projected image may be changed, and an RGB signal appropriate for the screen (or the projection surface) may be output (or projected).

The electronic apparatus 100 according to an embodiment of the disclosure may output an RGB signal.

The electronic apparatus 100 according to an embodiment of the disclosure may output signals in different forms other than an RGB signal. For example, the electronic apparatus 100 may output an RGBW signal and an RGBY signal. The electronic apparatus 100 may additionally output a signal of at least one of yellow, cyan, or magenta other than an RGB signal. Accordingly, the electronic apparatus 100 does not necessarily control only RGB by color calibration, but it may calibrate additional pixels (or sub-pixels).

The processor 130 may perform an operation of identifying whether the screen member 30 is a standard screen member 30 made by the manufacturer. This is because, if the screen member 30 is not a standard screen member 30, some errors may occur in the color space transformation matrix.

If it is identified that a predetermined (e.g., specified) object related to the screen member 30 is included in the first photographed image, the processor 130 may acquire the color space transformation information based on the first photographed image, and if it is identified that a predetermined object related to the screen member 30 is not included in the first photographed image, the processor 130 may control the projection part 120 to project a UI including information that the screen member 30 is not recognized. Specific operations in this regard will be described in greater detail below with reference to FIG. 20 to FIG. 22.

Example methods for the electronic apparatus 100 to acquire a photographed image may be divided into two.

According to an embodiment, the electronic apparatus 100 may receive a photographed image from the terminal apparatus 200 which may be an external apparatus. The electronic apparatus 100 may further include a communication interface 150 including various communication circuitry, and the processor 130 may control the communication interface to receive the first photographed image and the second photographed image from the external terminal apparatus 200.

According to an embodiment, the electronic apparatus 100 may acquire a photographed image using a camera 140 installed inside the electronic apparatus 100. The electronic apparatus 100 may further include a camera 140, and the processor 130 may control the camera 140 to acquire the first photographed image and the second photographed image.

The first pattern image may include at least one of a white pattern image, a red pattern image, a green pattern image, or a blue pattern image, and the second pattern image may include a white pattern image.

The processor 130 may control the projection part 120 such that the white pattern image among the plurality of pattern images included in the first pattern image is projected first, and the remaining pattern images are sequentially projected.

The first pattern image may be an image projected on the screen member 30, and the processor 130 may preferentially project the white pattern image. After acquiring a photographed image which photographed the screen member 30 on which the white pattern image is projected, the processor 130 may project the red pattern image, the green pattern image, or the blue pattern image in any order. If the white pattern image is output first, the projection order of the red pattern image, the green pattern image, or the blue pattern image may vary according to the user setting.

A reason that the second pattern image is output only as the white pattern image, unlike the first pattern image, is because it is advantageous for color calibration to use the white color for considering the color of the screen 10.

In the above, simple components of the electronic apparatus 100 were illustrated and described, but in actual implementation, various components may additionally be included. Explanation in this regard will be made in greater detail below with reference to FIG. 3.

There may be various methods of outputting the first pattern image and the second pattern image.

According to an embodiment, the first pattern image and the second pattern image may have been stored in the memory 110 of the first pattern image. In case a predetermined (e.g., specified) event occurs, the electronic apparatus 100 may output the first pattern image stored in the memory 110 or output the second pattern image stored in the memory 110.

According to an embodiment, the first pattern image and the second pattern image may be provided from the terminal apparatus 200. For example, if a predetermined (e.g., specified) control signal is received from the electronic apparatus 100, the terminal apparatus 200 may transmit the first pattern image or the second pattern image to the electronic apparatus 100 in real time. The predetermined control signal may be a signal requesting the first pattern image or a signal requesting the second pattern image. The electronic apparatus 100 may output the first pattern image or the second pattern image received from the terminal apparatus 200.

According to an embodiment, the first pattern image and the second pattern image may be provided from the server 300. For example, if a predetermined control signal is received from the electronic apparatus 100, the server 300 may transmit the first pattern image or the second pattern image to the electronic apparatus 100. The predetermined control signal may be a signal requesting the first pattern image or a signal requesting the second pattern image. The electronic apparatus 100 may output the first pattern image or the second pattern image received from the terminal apparatus 200.

There may be various methods of acquiring color space information corresponding to the first pattern image.

According to an embodiment, color space information corresponding to the first pattern image may have been stored in the memory 110. In case a predetermined event occurred, the electronic apparatus 100 may acquire the color space information corresponding to the first pattern image stored in the memory 110.

According to an embodiment, the color space information corresponding to the first pattern image may be provided from the server 300. For example, if a predetermined control signal is received, the server 300 may transmit the color space information corresponding to the first pattern image to the electronic apparatus 100. The predetermined control signal may be a signal requesting the color space information corresponding to the first pattern image. The electronic apparatus 100 may receive the color space information corresponding to the first pattern image.

There may be various time points of outputting the first pattern image and the second pattern image.

According to an embodiment, the electronic apparatus 100 may output the first pattern image first, and output the second pattern image after the first pattern image is output. For example, the electronic apparatus 100 may output the first pattern image in a state wherein the screen member 30 is installed, and output the second pattern image in a state wherein the screen member 30 is not installed.

According to an embodiment, the electronic apparatus 100 may output the first pattern image and the second pattern image simultaneously. For example, the electronic apparatus 100 may output the first pattern image and the second pattern image simultaneously in a state wherein the screen member 30 is installed. The electronic apparatus 100 may output the first pattern image in the first area wherein the screen member 30 is located among the entire areas of the projection surface, and output the second pattern image in the second area wherein the screen member 30 is not located among the entire areas of the projection surface. The electronic apparatus 100 may acquire a photographed image which photographed the projection surface. The photographed image may include the first pattern image output in the first area and the second pattern image output in the second area. The electronic apparatus 100 may acquire transformation information (e.g., a color space transformation matrix) based on the first pattern image output in the first area, and perform color calibration based on the second pattern image output in the second area. The electronic apparatus 100 may acquire the transformation information (e.g., a color space transformation matrix) based on the original image of the first pattern image and the first pattern image included in the photographed image, and at the same time, perform color calibration according to the characteristic of the projection surface based on the original image of the second pattern image, the second pattern image included in the photographed image, and the transformation information (e.g., a color space transformation matrix).

The electronic apparatus 100 may be implemented in a form wherein the first pattern image and the second pattern image are the same, and color calibration is performed with one photographed image. For example, the electronic apparatus 100 may output the pattern image in a state wherein the screen member 30 is included. The electronic apparatus 100 may output the pattern image in both of the first area wherein the screen member 30 is included and the second area wherein the screen member 30 is not included. For example, some of the pattern image may be output in the first area (including the screen member 30), and some of the pattern image may be output in the second area (not including the screen member 30). The electronic apparatus 100 may acquire the transformation information (e.g., a color space transformation matrix) based on the original image of the pattern image and the pattern image included in the photographed image, and at the same time, perform color calibration according to the characteristic of the projection surface based on the original image of the pattern image, the pattern image included in the photographed image, and the transformation information (e.g., a color space transformation matrix).

Figure 3:
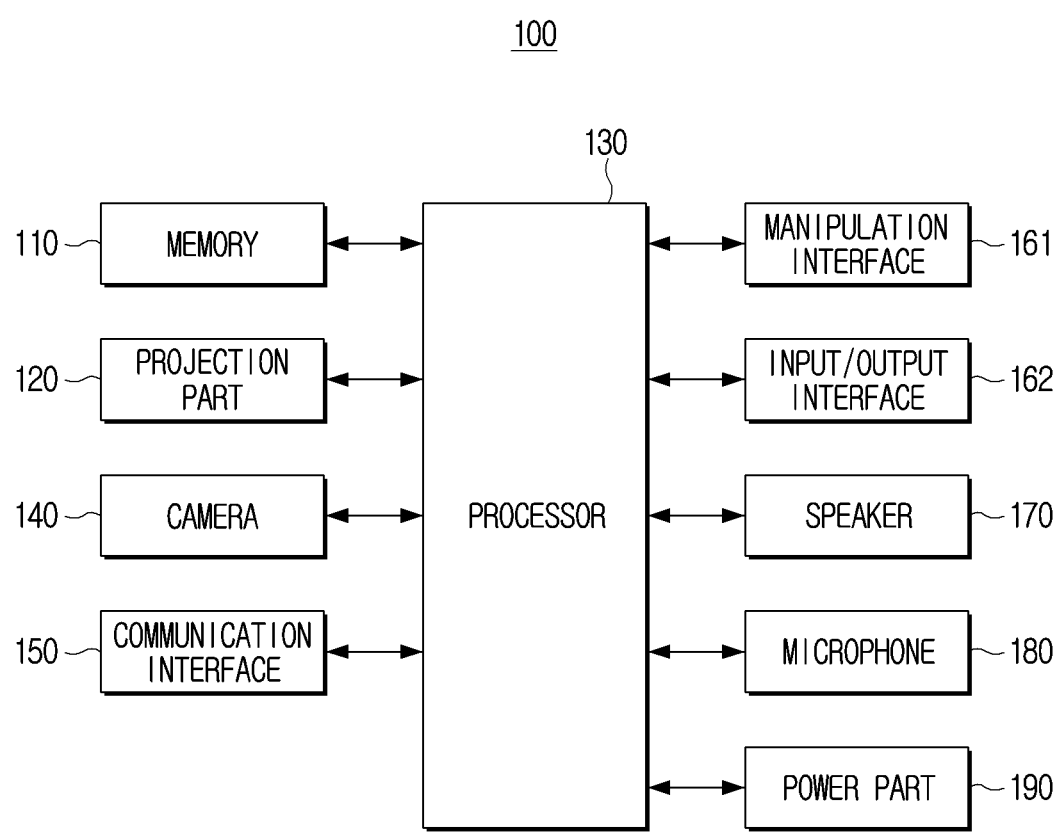
FIG. 3 is a block diagram illustrating an example configuration of the electronic apparatus in FIG. 2 according to various embodiments.

FIG. 3 is a block diagram illustrating an example configuration of the electronic apparatus 100 in FIG. 2 according to various embodiments.

Referring to FIG. 3, the electronic apparatus 100 may include at least one of a memory 110, a projection part (e.g., including a projector or projection lens) 120, a processor (e.g., including processing circuitry) 130, a camera 140, a communication interface (e.g., including communication circuitry) 150, a manipulation interface (e.g., including various circuitry) 161, an input/output interface (e.g., including various input/output circuitry) 162, a speaker 170, a microphone 180, or a power part (e.g., including power management circuitry) 190.

Among the operations of the memory 110, the projection part 120, and the processor 130, regarding operations identical or similar to what were described above, overlapping explanation may not be repeated here.

The camera 140 is a component for photographing a subject and generating a photographed image, and here, the photographed image is a concept including both of a moving image and a still image. The camera 140 may acquire an image for at least one external apparatus, and it may be implemented as a camera, a lens, an infrared sensor, etc.

The camera 140 may include a lens and an image sensor. As types of the lens, there are a general generic-purpose lens, a wide-angle lens, a zoom lens, etc., and the type may be determined according to the type, the characteristic, the use environment, etc. of the electronic apparatus 100. As the image sensor, a complementary metal oxide semiconductor (CMOS) and a charge coupled device (CCD), etc. may be used.

The camera 140 outputs an incident light as an image signal. For example, the camera 140 may include a lens, pixels, and an AD converter. The lens gathers the light of a subject and makes an optical image formed in a photographing area, and the pixels may output the light introduced through the lens as an image signal in an analog form. The AD converter may convert the image signal in an analog form into an image signal in a digital form, and output the signal. For example, the camera 140 is arranged to photograph the front surface direction of the electronic apparatus 100, and photograph a user who exists on the front surface of the electronic apparatus 100, and generate a photographed image.

The communication interface 150 is a component performing communication with external apparatuses in various types according to communication methods in various types. The communication interface 150 may include various communication circuitry including, for example, a wireless communication module or a wired communication module. Each communication module may be implemented in a form of at least one hardware chip.

A wireless communication module may be a module communicating with an external apparatus wirelessly. For example, the wireless communication module may include at least one module among a Wi-Fi module, a Bluetooth module, an infrared communication module, or other communication modules.

A Wi-Fi module and a Bluetooth module may perform communication using a Wi-Fi method and a Bluetooth method, respectively. In the case of using a Wi-Fi module or a Bluetooth module, various types of connection information such as an SSID and a session key is transmitted and received first, and connection of communication is performed using the information, and various types of information can be transmitted and received thereafter.

An infrared communication module performs communication according to an infrared Data Association (IrDA) technology of transmitting data to a near field wirelessly using infrared rays between visible rays and millimeter waves.

Other communication modules may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

A wired communication module may be a module communicating with an external apparatus via wire. For example, a wired communication module may include at least one of a local area network (LAN) module, an Ethernet module, a pair cable, a coaxial cable, an optical fiber cable, or an ultra wide-band (UWB) module.

The manipulation interface 161 may include various circuitry and be implemented as an apparatus like a button, a touch pad, a mouse, and a keyboard, or as a touch screen that can perform both of the aforementioned display function and a manipulation input function together. A button may be various types of buttons such as a mechanical button, a touch pad, a wheel, etc. formed in any areas such as the front surface part, the side surface part, the rear surface part, etc. of the exterior of the main body of the electronic apparatus 100.

The input/output interface 162 may be an interface including various input/output circuitry including of any one of a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI). The input/output interface 162 may input or output at least one of an audio signal or a video signal. Depending on implementation examples, the input/output interface 162 may include a port outputting only audio signals and a port outputting only video signals as separate ports, or it may be implemented as one port that inputs and outputs both audio signals and video signals. The electronic apparatus 100 may transmit at least one of an audio signal or a video signal to an external apparatus (e.g., an external display apparatus or an external speaker) through the input/output interface 162. Specifically, an output port included in the input/output interface 162 may be connected with an external apparatus, and the electronic apparatus 100 may transmit at least one of an audio signal or a video signal to the external apparatus through the output port.

The input/output interface 162 may be connected with the communication interface. The input/output interface 162 may transmit information received from an external apparatus to the communication interface, or transmit information received through the communication interface to an external apparatus.

The speaker 170 may be a component that outputs not only various kinds of audio data but also various kinds of notification sounds or voice message, etc.

The electronic apparatus 100 may include a microphone 180.

The microphone 180 is a component for receiving input of a user voice or other sounds and converting them into audio data. The microphone 180 may receive a voice of a user in an activated state. For example, the microphone 180 may be formed as an integrated type on the upper side or the front surface direction, the side surface direction, etc. of the electronic apparatus 100. The microphone 180 may include various components such as a microphone collecting a user voice in an analog form, an amp circuit amplifying the collected user voice, an A/D conversion circuit that samples the amplified user voice and converts the user voice into a digital signal, a filter circuit that removes noise components from the converted digital signal, etc.

The power part 190 may include various power management circuitry and be provided with power from the outside, and provide power to the various components of the electronic apparatus 100. The power part 190 according to an embodiment of the disclosure may be provided with power through various methods. The power part 190 may be provided with power using a DC power code of 220V. However, the disclosure is not limited thereto, and the electronic apparatus 100 may be provided with power using a USB power code or provided with power using a wireless charging method.

The electronic apparatus 100 may further include a display (not shown).

The display (not shown) may be implemented as displays in various forms such as a liquid crystal display (LCD), an organic light emitting diodes (OLED) display, a plasma display panel (PDP), etc. Inside the display (not shown), driving circuits that may be implemented in forms such as an a-si TFT, a low temperature poly silicon (LTPS) TFT, an organic TFT (OTFT), etc., a backlight unit, etc. may also be included. The display (not shown) may be implemented as a touch screen combined with a touch sensor, a flexible display, a 3D display, etc. The display (not shown) according to an embodiment of the disclosure may include not only a display panel outputting images, but also a bezel housing the display panel. In particular, a bezel according to an embodiment of the disclosure may include a touch sensor (not shown) for detecting user interactions.

FIG. 4 is a table illustrating various examples of performing color calibrating operations according to various embodiments.

Referring to the table 410 in FIG. 4, in performing a color calibrating operation, various embodiments may exist according to a subject acquiring an image and a method of using the screen member. The subject acquiring an image may be the terminal apparatus 200 or the electronic apparatus 100. The method of using the screen member may be a method of installation by a user or a method of accommodation inside the electronic apparatus.

The method of installation by a user may refer, for example, to a user installing a separate screen member 30 on the projection surface directly. The method of accommodation inside the electronic apparatus may refer, for example, to a method wherein the screen member 30 is accommodated inside the electronic apparatus 100, and the screen member 30 is used automatically.

According to the first embodiment, a color calibrating operation may be performed based on an operation of the terminal apparatus 200 of acquiring an image and an operation of a user of directly installing the screen member 30. Specific explanation in this regard will be described in greater detail below with reference to FIG. 5.

According to the second embodiment, a color calibrating operation may be performed based on an operation of the terminal apparatus 200 of acquiring an image and an operation of using the screen member 30 accommodated inside the electronic apparatus 100. Specific explanation in this regard will be described in FIG. 6.

According to the third embodiment, a color calibrating operation may be performed based on an operation of the electronic apparatus 100 of acquiring an image and an operation of a user of directly installing the screen member 30. Specific explanation in this regard will be described in FIG. 7.

According to the fourth embodiment, a color calibrating operation may be performed based on an operation of the electronic apparatus 100 of acquiring an image and an operation of using the screen member 30 accommodated inside the electronic apparatus 100. Specific explanation in this regard will be described in FIG. 8. While the terms "first embodiment", "second embodiment", "third embodiment", "fourth embodiment", or the like are used herein for ease of description, it will be understood that the various embodiments are not necessarily mutually exclusive and that any of the embodiment(s) described herein may be used in conjunction with any other embodiment(s) described herein.

FIG. 5 is a diagram illustrating an example color calibrating operation according to various embodiments.

Referring to FIG. 5, a user may install the screen member (e.g., a reflector) 30 on the screen 10. After the screen member 30 is installed on the screen 10, the electronic apparatus 100 may project the first pattern image 510 on the screen member 30. The terminal apparatus 200 may photograph the first pattern image 510 projected on the screen member 30.

Figure 6:
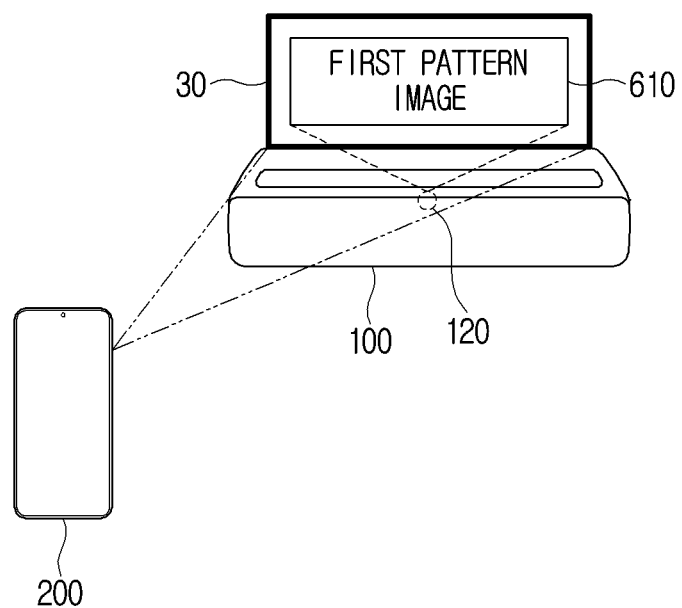
FIG. 6 is a diagram illustrating an example color calibrating operation according to various embodiments.

FIG. 6 is a diagram illustrating an example color calibrating operation according to various embodiments.

Referring to FIG. 6, the electronic apparatus 100 may include the screen member 30. As an example, the screen member 30 included in the electronic apparatus 100 may be spread as in FIG. 6 by a user's manipulation. As another example, the screen member 30 included in the electronic apparatus 100 may be spread as in FIG. 6 by a motor (not shown). In a state wherein the screen member 30 is spread, the electronic apparatus 100 may project the first pattern image 610 on the screen member 30. The terminal apparatus 200 may photograph the first pattern image 610 projected on the screen member 30.

Figure 7:
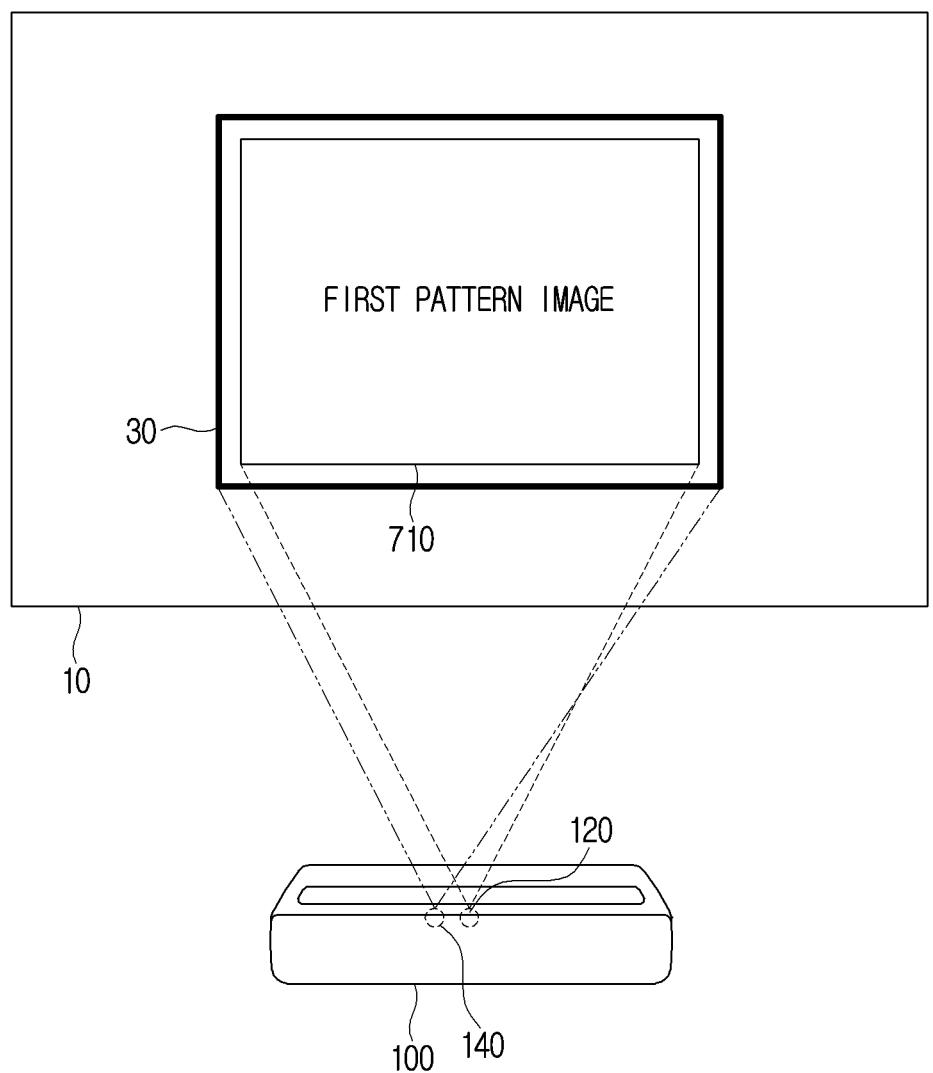
FIG. 7 is a diagram illustrating an example color calibrating operation according to various embodiments.

FIG. 7 is a diagram illustrating an example color calibrating operation according to various embodiments.

Referring to FIG. 7, a user may install the screen member 30 on the screen 10. After the screen member 30 is installed on the screen 10, the electronic apparatus 100 may project the first pattern image 710 on the screen member 30 using the projection part 120. The electronic apparatus 100 may photograph the first pattern image 710 projected on the screen member 30 using the camera 140 included in the electronic apparatus 100.

Figure 8:
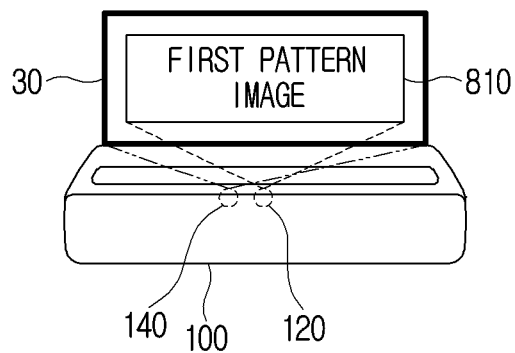
FIG. 8 is a diagram illustrating an example color calibrating operation according to various embodiments.

FIG. 8 is a diagram illustrating an example color calibrating operation according to various embodiments.

Referring to FIG. 8, the electronic apparatus 100 may include the screen member 30. As an example, the screen member 30 included in the electronic apparatus 100 may be spread as in FIG. 8 by a user's manipulation. As another example, the screen member 30 included in the electronic apparatus 100 may be spread as in FIG. 8 by a motor (not shown). In a state wherein the screen member 30 is spread, the electronic apparatus 100 may project the first pattern image 810 on the screen member 30. Then, the electronic apparatus 100 may photograph the first pattern image 810 projected on the screen member 30.

Figure 9:
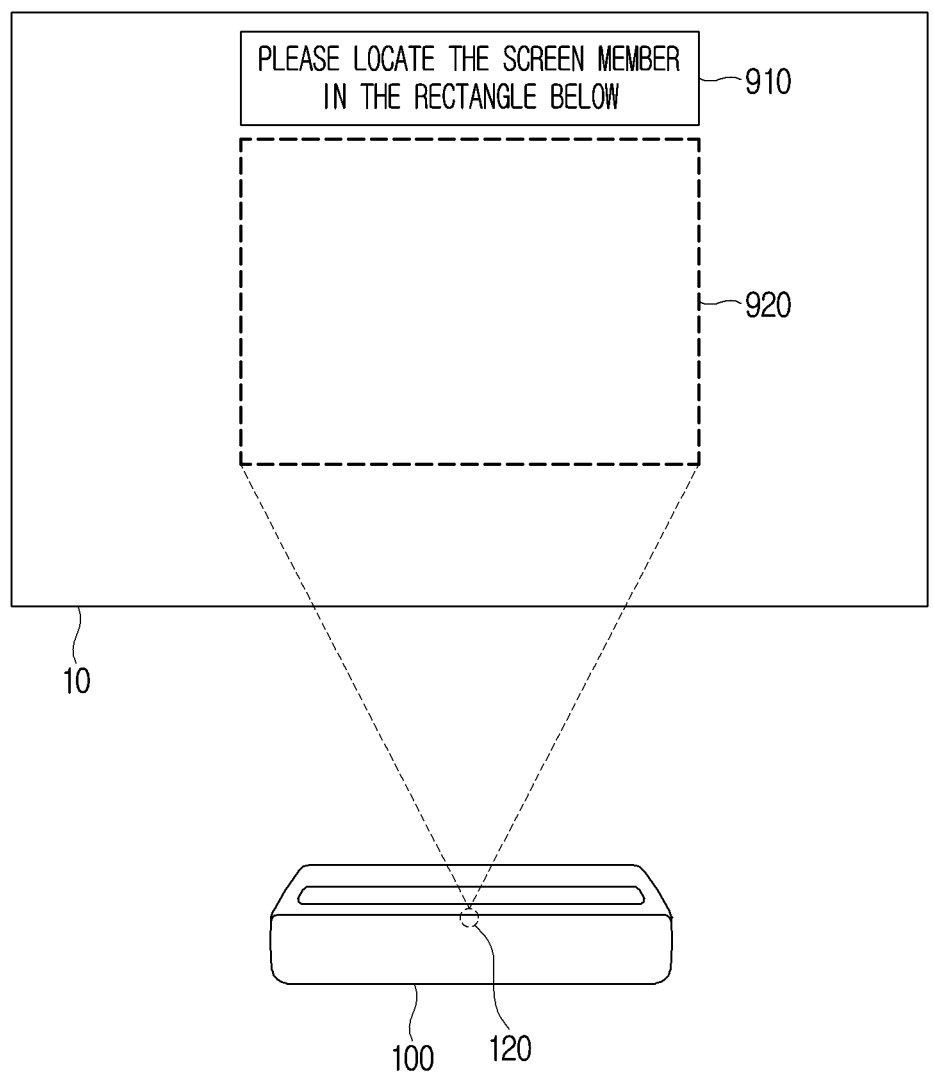
FIG. 9 is a diagram illustrating example operations of using a screen member according to various embodiments.

FIG. 9 is a diagram illustrating example operations of using the screen member 30 according to various embodiments.

Referring to FIG. 9, the electronic apparatus 100 may project an image for guiding the arrangement location of the screen member through the projection part 120. For example, the guide image projected by the electronic apparatus 100 may include at least one of a text 910 or a UI 920 for guiding the arrangement of the screen member 30. A user may easily figure out the location of the screen member 30 based on the projected UI 920, and locate the screen member 30 as it is on the projected UI 920.

FIG. 10 is a diagram illustrating example operations of using the screen member 30 according to various embodiments.

Referring to FIG. 10, the electronic apparatus 100 may include the screen member 30. As an example, the screen member 30 included in the electronic apparatus 100 may be spread by a user's manipulation. As another example, the screen member 30 included in the electronic apparatus 100 may be spread by a motor (not shown).

Referring to FIG. 10, 1010 expresses a state wherein the screen member 30 is folded. 1020 expresses a state wherein the screen member 30 is spread. 1030 expresses a state wherein the projection part 120 or the camera 140 is arranged on the electronic apparatus 100.

The screen member 30 disclosed in FIG. 10 is illustrated to be attached on the electronic apparatus 100. The screen member 30 may be attached to or detached from the electronic apparatus 100, and a user may separate the screen member 30 from the electronic apparatus 100 and attach it on the projection surface. Accordingly, a user does not have to keep the screen member 30 separately, and a user may keep the screen member 30 easily by fixing it on the electronic apparatus 100.

FIG. 11 is a diagram illustrating an example operation of generating a color space transformation matrix according to various embodiments.

Referring to FIG. 11, the electronic apparatus 100 may perform an operation of acquiring a color space transformation matrix.

Referring to the FIG. 11, 1110, the electronic apparatus 100 may store color space information corresponding to the first pattern image 1111. The color space information may refer, for example, to a CIE XYZ color space. CIE may refer, for example, to the International Commission on Illumination (Commission Internationale de l'Eclairage). For example, the electronic apparatus 100 may project the first pattern image 1111 on the screen member 30. Then, a professional measurement apparatus 1100 may photograph the first pattern image 1111 projected on the screen member 30. Based on the image which photographed the first pattern image 1111, the electronic apparatus 100 may acquire color space information corresponding to the first pattern image 1111. The acquired color space information may be standard information. As the professional measurement apparatus 1100 is an apparatus having high precision, it would be difficult for general consumers to own it. Accordingly, there may be a difference between an image photographed by the professional measurement apparatus 1100 and an image photographed by a general terminal apparatus 200.

Referring to 1120, the electronic apparatus 100 may acquire RGB information corresponding to the first pattern image 1121. For example, the electronic apparatus 100 may project the first pattern image 1121 on the screen member 30, and the terminal apparatus 200 may photograph the projected first pattern image 1121. Here, the first pattern image 1121 may be the same as the first pattern image 1111 in the embodiment 1110. The electronic apparatus 100 may acquire RGB information corresponding to the first pattern image photographed by the terminal apparatus 200.

The electronic apparatus 100 may acquire a color space transformation matrix based on the CIE XYZ color space information corresponding to the first pattern image 1111 acquired through the embodiment 1110 and the RGB information corresponding to the first photographed image acquired through the embodiment 1120.

Figure 12:
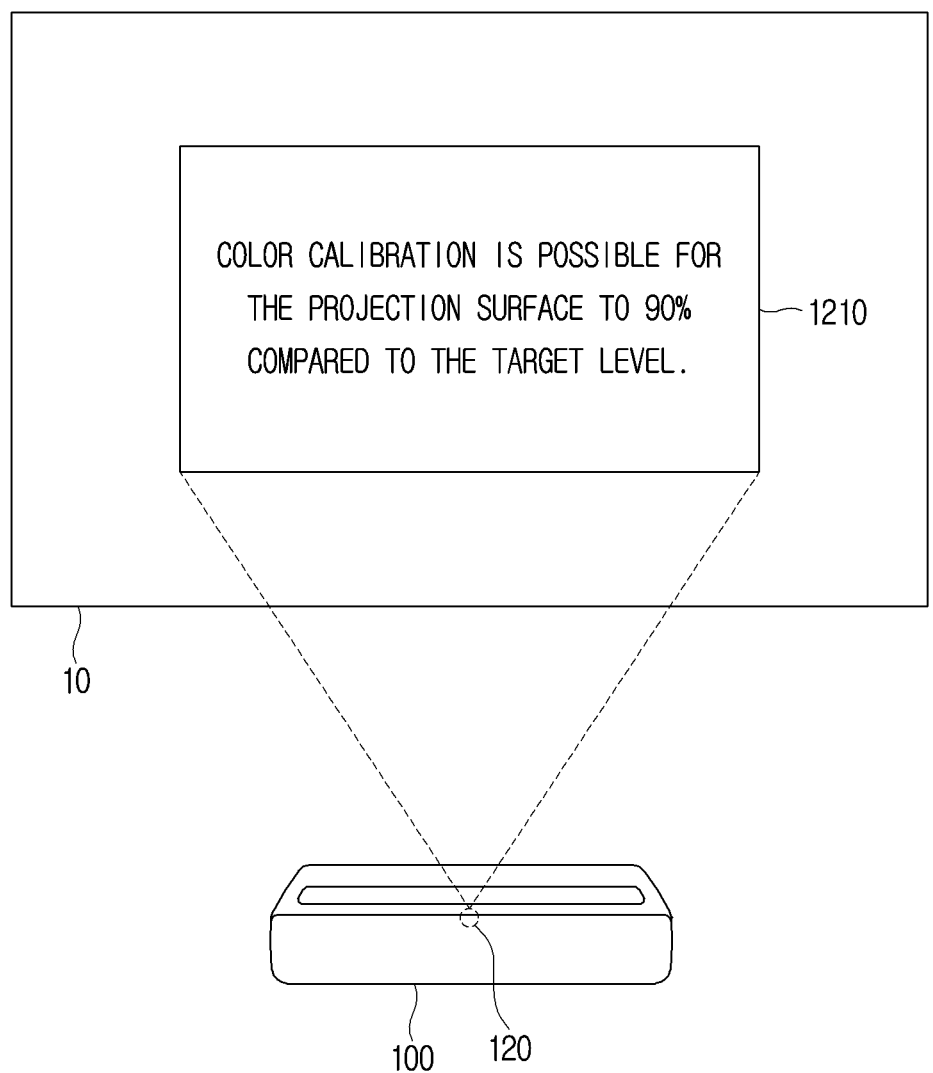
FIG. 12 is a diagram illustrating an example operation of projecting a color calibration result according to various embodiments.

FIG. 12 is a diagram illustrating an example operation of projecting a color calibration result according to various embodiments.

Referring to FIG. 12, after performing a color calibrating operation, the electronic apparatus 100 may project a result image 1210 on the screen 10. The result image may include information indicating to which ratio the color calibration is possible for the projection surface compared to the target level. For example, if the target level is 100%, the electronic apparatus 100 may project the result image 1210 including information that the color calibration is possible to 90% of the target level on the screen 10.

Figure 13:
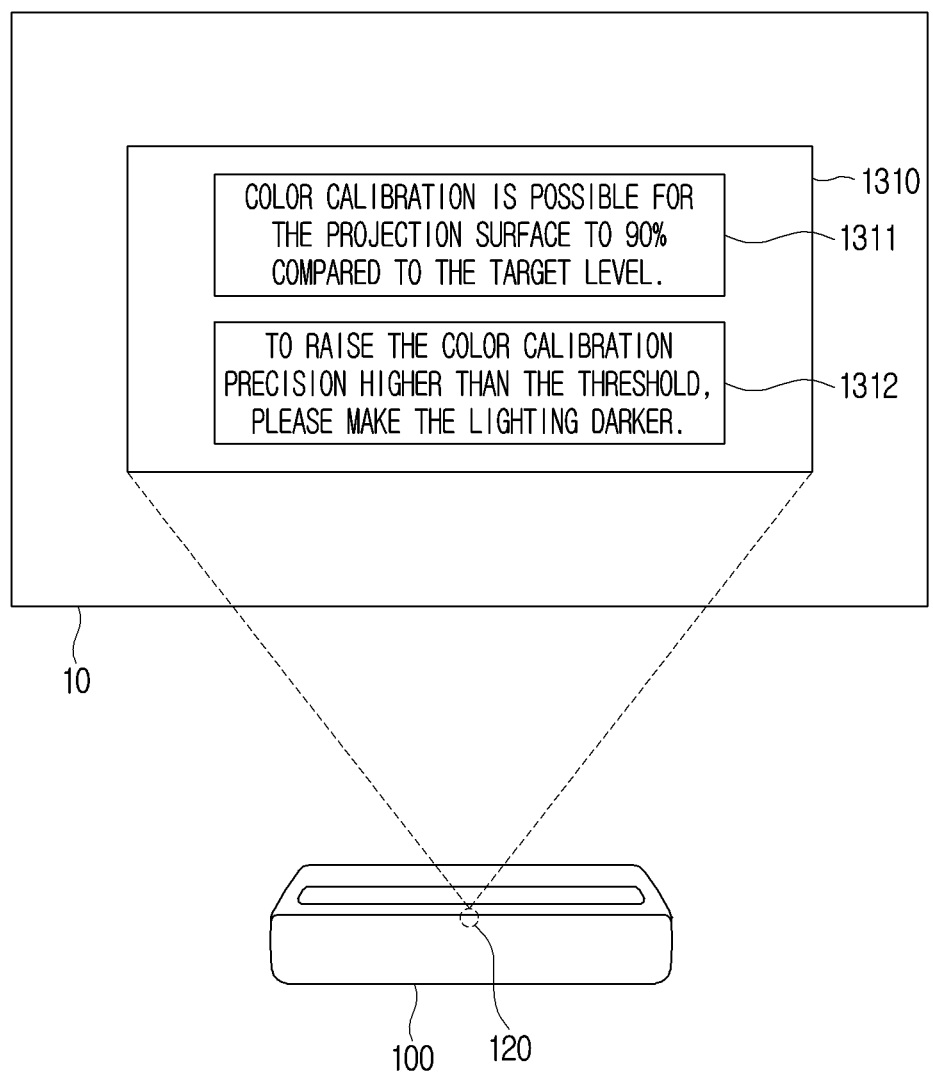
FIG. 13 is a diagram illustrating an example operation of guiding a user behavior corresponding to a color calibration result according to various embodiments.

FIG. 13 is a diagram illustrating an example operation of guiding a user behavior corresponding to a color calibration result according to various embodiments.

Referring to FIG. 13, after performing a color calibrating operation, the electronic apparatus 100 may project a result image 1310 including the color calibration result 1311 and information for guiding a user behavior 1312 on the screen 10. The color calibration result 1311 may refer, for example, to information indicating to which ratio the color calibration is possible compared to the target level. The information for guiding a user behavior 1312 may include an action that a user can take for making the color calibration result better. For example, the information for guiding a user behavior 1312 may include information guiding to make the lighting dark for enhancing the precision of the color calibration. In case the lighting is made to be dark, the first pattern image or the second pattern image may be recognized more clearly. Accordingly, the electronic apparatus 100 may provide information guiding to make the lighting dark for enhancing the precision of the color calibration to a user.

FIG. 14 is a diagram illustrating an example operation of comparing projection before color calibration and projection after color calibration according to various embodiments.

Referring to FIG. 14, 1401 may indicate the electronic apparatus 100 projecting a result image 1410 according to the setting before color calibration. The electronic apparatus 100 may project the result image 1410 after the color calibrating operation. The result image 1410 may include at least one of a UI 1411 indicating the color calibration result, a UI 1412 for guiding to project the result image according to the setting before the color calibration, a UI 1413 for guiding to project the result image according to the setting after the color calibration, or a UI 1414 for guiding the user's selection for applying the setting after the color calibration. For example, if the user selects the UI 1412 for guiding to project the result image according to the setting before the color calibration, the electronic apparatus 100 may control the projection part 120 to project the result image 1410 according to the setting before the color calibration.

Referring to FIG. 14, 1402 may indicate the electronic apparatus 100 projecting a result image 1420 according to the setting after the color calibration. For example, if the user selects the UI 1413 for guiding to project the result image according to the setting after the color calibration, the electronic apparatus 100 may control the projection part 120 to project the result image 1420 according to the setting after the color calibration.

The result image 1410 may be an image projected according to the setting before the color calibration. Accordingly, the result image 1410 may be recognized differently due to the color of the screen 10. However, the result image 1420 may be an image projected according to the setting after the color calibration. Accordingly, the result image 1420 may be expressed in the color of the image as it is that was initially intended, in spite of the color of the screen 10.

The result image projected without a separate user selection after the color calibrating operation may be any one image between the result image 1410 of the embodiment 1401 and the result image 1420 of the embodiment 1402.

Figure 15:
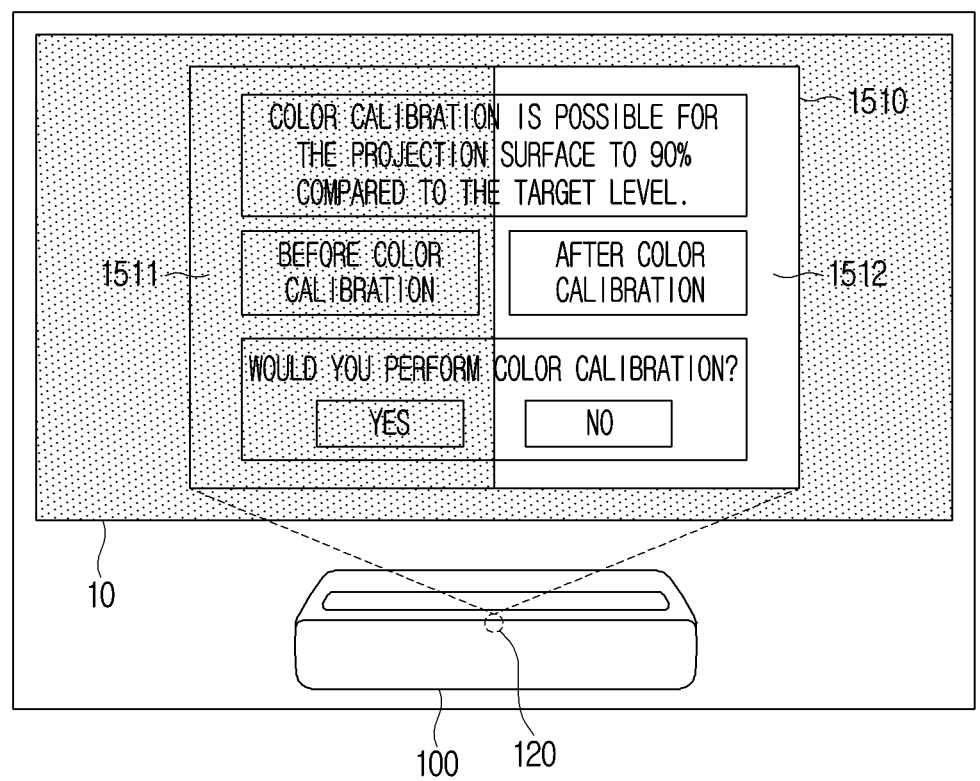
FIG. 15 is a diagram illustrating an example operation of comparing projection before color calibration and projection after color calibration according to an various embodiments.

FIG. 15 is a diagram illustrating an example operation of comparing projection before color calibration and projection after color calibration according to various embodiments.

Referring to FIG. 15, the electronic apparatus 100 may project a result image 1510. The result image 1510 may be divided into two areas. The first area 1511 may be an area projected to the setting before the color calibration among the entire areas of the result image 1510. The second area 1512 may be an area projected to the setting after the color calibration among the entire areas of the result image 1510. The electronic apparatus 100 may project some areas in the result image 1510 to the setting before the color calibration, and project the remaining areas to the setting after the color calibration.

FIG. 16 is a diagram illustrating an example operation of projecting information related to a terminal apparatus that can be connected with the electronic apparatus 100 according to various embodiments.

Referring to FIG. 16, the electronic apparatus 100 may project an image 1610 including a list of at least one apparatus that can be connected with the electronic apparatus 100. For example, it is assumed that the electronic apparatus 100 is in a state of being able to be connected with the first terminal apparatus, the second terminal apparatus, and the third terminal apparatus. The electronic apparatus 100 may project information corresponding to the three terminal apparatuses as a list. If a UI 1611 for connecting with the first terminal apparatus is selected by the user, the electronic apparatus 100 may perform connection of communication with the first terminal apparatus.

When the electronic apparatus 100 is communicatively connected with a specific terminal apparatus, the electronic apparatus 100 may project a result image 1620. The result image 1620 may include at least one of information 1621 notifying that the electronic apparatus 100 is connected with a specific terminal apparatus or a UI 1622 for selecting whether to maintain connection with the specific terminal apparatus. The UI 1622 for selecting whether to maintain connection with the specific terminal apparatus may include at least one of a UI 1623 corresponding to maintenance of connection or a UI 1624 corresponding to release of connection. If the UI 1624 corresponding to release of connection is selected by the user, the electronic apparatus 100 may finish connection of communication with the specific terminal apparatus previously connected (e.g., the first terminal apparatus).

After connection of communication with the specific terminal apparatus (e.g., the first terminal apparatus) is finished, the electronic apparatus 100 may project an image 1630 including the list of connectable apparatuses again. The image 1630 may project the UIs 1631, 1632 corresponding to apparatuses that can be connected with the electronic apparatus 100 but of which connection was released in layouts different from the other UIs. For example, the electronic apparatus 100 may display the UIs 1631, 1632 corresponding to the first terminal apparatus of which connection was already released in a dim color or in a gray color.

Figure 17:
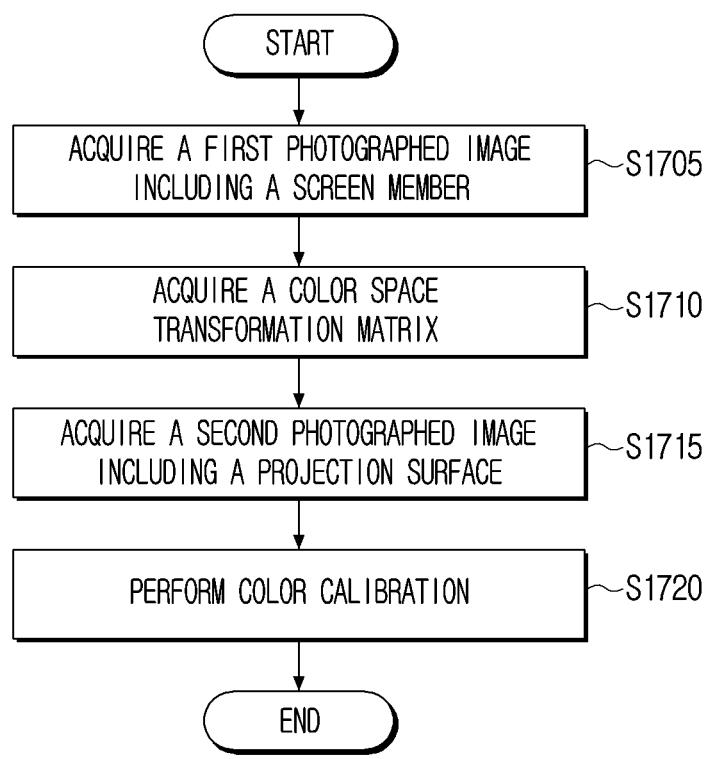
FIG. 17 is a flowchart illustrating an example process of performing an operation of acquiring a color space transformation matrix and an operation of performing a color calibrating operation according to various embodiments.

FIG. 17 is a flowchart illustrating an example process of performing an operation of acquiring a color space transformation matrix and an operation of performing a color calibrating operation according to various embodiments.

Referring to FIG. 17, the electronic apparatus 100 may acquire a first photographed image including the screen member 30 in operation S1705. The first photographed image may be photographed by the electronic apparatus 100 or the terminal apparatus 200. The electronic apparatus 100 may acquire a color space transformation matrix in operation S1710. The color space transformation matrix may be generated based on the first photographed image. The electronic apparatus 100 may acquire a second photographed image including the screen (e.g., projection surface) 10 in operation S1715. The second photographed image may be photographed by the electronic apparatus 100 or the terminal apparatus 200. The electronic apparatus 100 may perform a color calibrating operation in operation S1720. The color calibrating operation may be performed based on the second photographed image.

Figure 18:
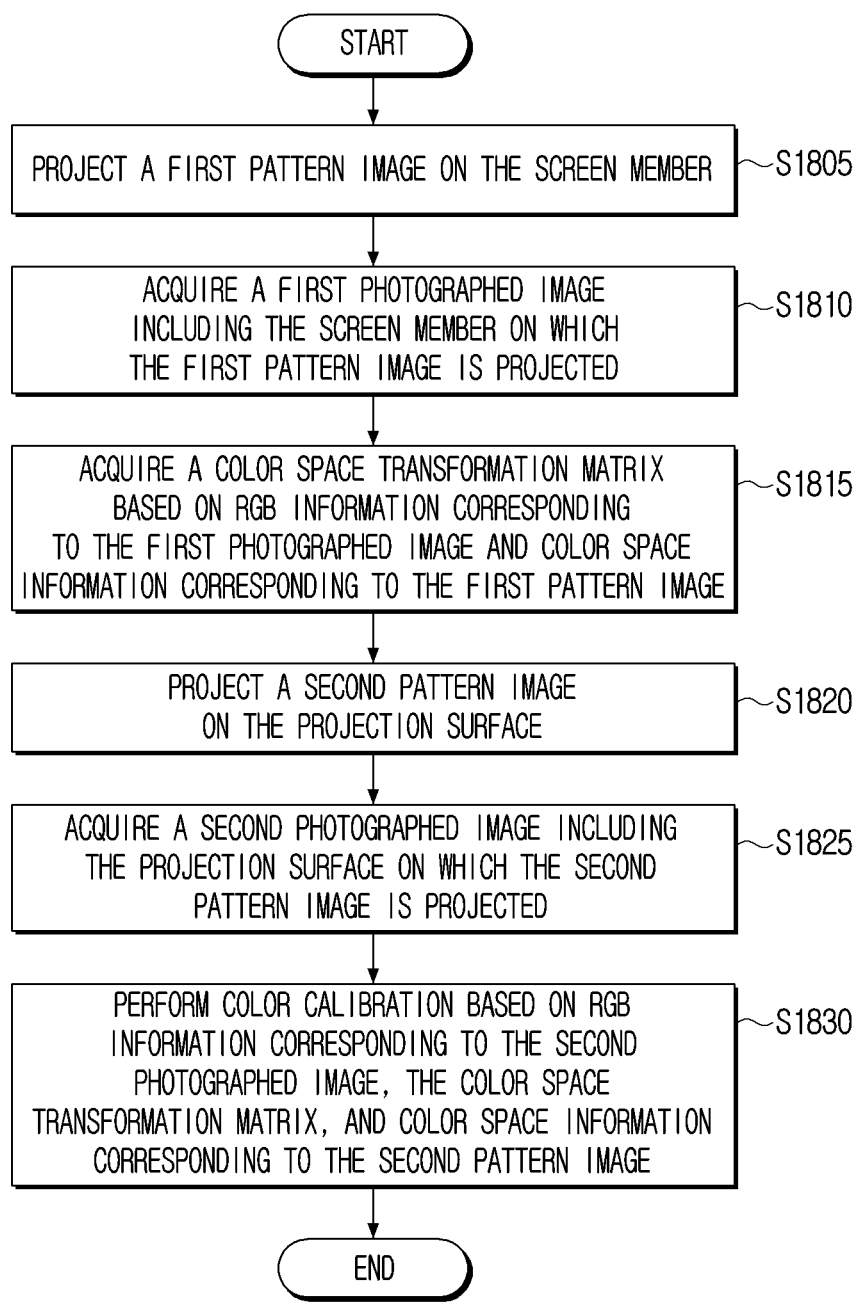
FIG. 18 is a flowchart illustrating an example operation of acquiring a color space transformation matrix according to various embodiments.

FIG. 18 is a flowchart illustrating an example operation of acquiring a color space transformation matrix according to various embodiments.

Referring to FIG. 18, the electronic apparatus 100 may project a first pattern image on the screen member 30 in operation S1805. The electronic apparatus 100 may acquire a first photographed image including the screen member 30 on which the first pattern image is projected in operation S1810. The electronic apparatus 100 may acquire a color space transformation matrix based on RGB information corresponding to the first photographed image and color space information corresponding to the first pattern image in operation S1815. The electronic apparatus 100 may project a second pattern image on the screen 10 in operation S1820. The electronic apparatus 100 may acquire a second photographed image including the screen 10 on which the second pattern image is projected in operation S1825. The electronic apparatus 100 may perform color calibration based on RGB information corresponding to the second photographed image, the color space transformation matrix, and color space information corresponding to the second pattern image in operation S1830.

Figure 19:
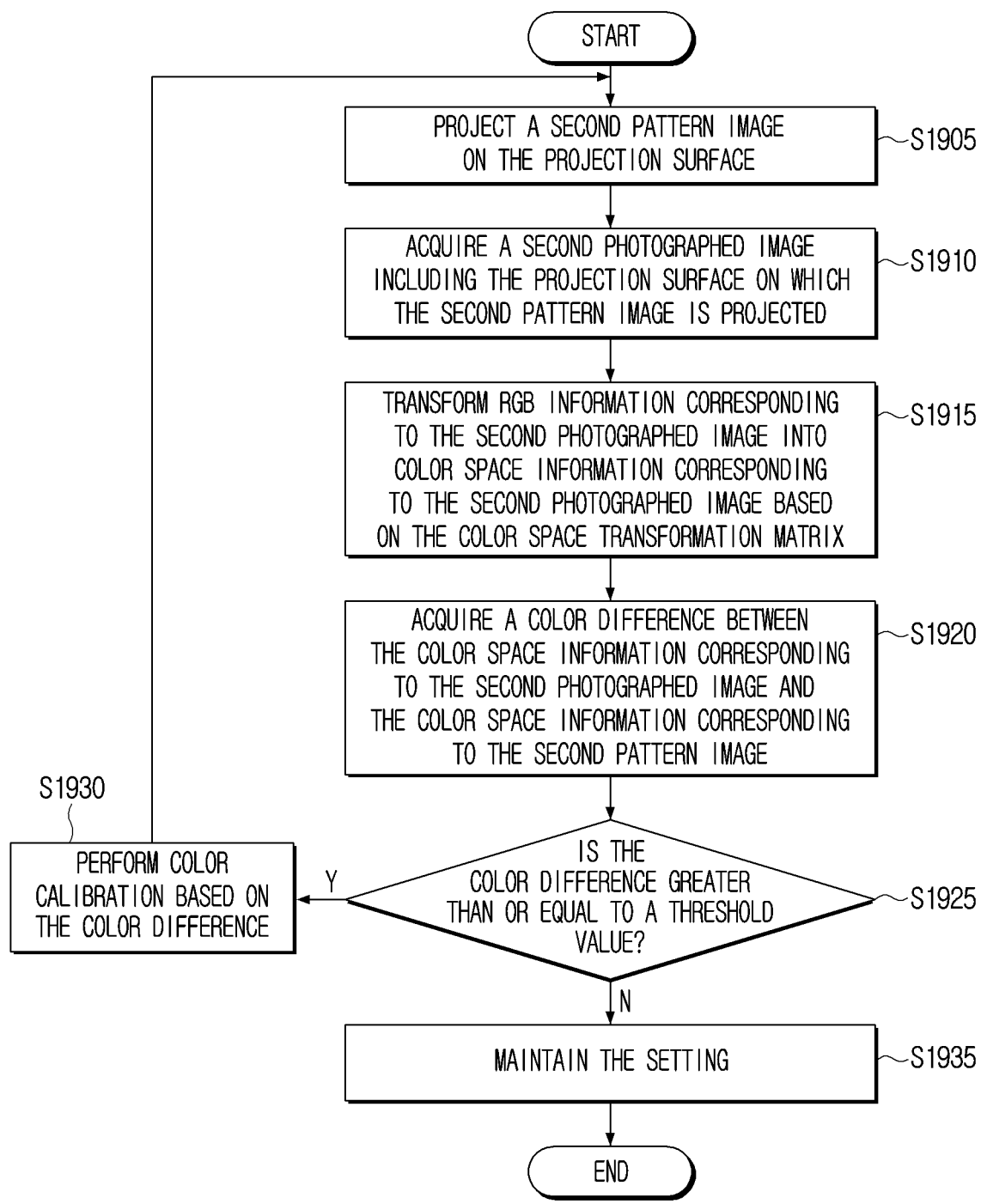
FIG. 19 is a flowchart illustrating an example color calibrating operation according to various embodiments.

FIG. 19 is a flowchart illustrating an example color calibrating operation according to various embodiments.

Referring to FIG. 19, after acquiring a color space transformation matrix, the electronic apparatus 100 may project a second pattern image on the screen (e.g., projection surface) 10 in operation S1905. The electronic apparatus 100 may acquire a second photographed image including the screen (e.g., projection surface) 10 on which the second pattern image is projected in operation S1910. The electronic apparatus 100 may transform (or convert) RGB information corresponding to the second photographed image into color space information corresponding to the second photographed image based on the color space transformation matrix in operation S1915. The electronic apparatus 100 may acquire a color difference between the color space transformation corresponding to the second photographed image and the color space information corresponding to the second pattern image in operation S1920.

The electronic apparatus 100 may identify whether the color difference is greater than or equal to a threshold value in operation S1925. If the color difference is greater than or equal to the threshold value in operation S1925—Y, the electronic apparatus 100 may perform color calibration based on the color difference in operation S1930. After performing the color calibration, the electronic apparatus 100 may project the second pattern image again. The electronic apparatus 100 may repeat the operations S1905 to S1925. If the color difference is less than the threshold value in operation S1925—N, the electronic apparatus 100 may maintain the currently set value without performing color calibration in operation S1935.

Figure 20:
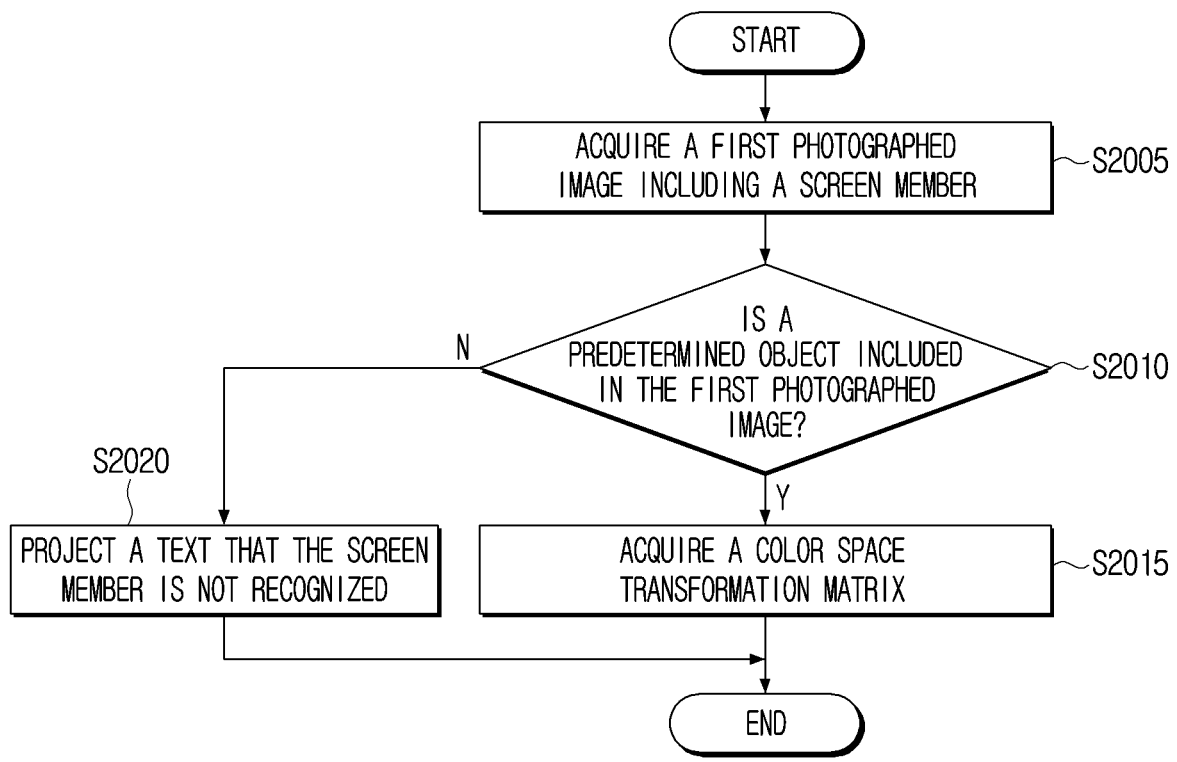
FIG. 20 is a flowchart illustrating an example operation of identifying whether a predetermined object is included in a screen member according to various embodiments.

FIG. 20 is a flowchart illustrating an example operation of identifying whether a predetermined object is included in the screen member 30 according to various embodiments.

Referring to FIG. 20, in the first embodiment and the third embodiment of FIG. 4 wherein a user directly installs the screen member 30, there is a need to check whether the screen member 30 is a genuine screen member 30 corresponding to the electronic apparatus 100. This is because, in case the screen member 30 is not a genuine screen member 30, color calibration may not be performed correctly.

The electronic apparatus 100 may acquire a first photographed image including the screen member 30 in operation S2005. The electronic apparatus 100 may identify whether a predetermined (e.g., specified) object is included in the first photographed image in operation S2010. The predetermined object may refer, for example, to an object for identifying whether the screen member 30 is a screen member corresponding to the electronic apparatus 100. A more detailed explanation in this regard will be provided below with reference to FIG. 21 and FIG. 22.

If the predetermined object is included in the first photographed image in operation S2010—Y, the electronic apparatus 100 may acquire a color space transformation matrix in operation S2015. The feature that the predetermined object is included in the first photographed image may refer, for example, to the screen member 30 existing on the screen 10. The predetermined object may be an object related to the screen member 30.

If the predetermined object is not included in the first photographed image in operation S2010—N, the electronic apparatus 100 may project a text that the screen member 30 is not recognized in operation S2020. The feature that the predetermined object is not included in the first photographed image may refer, for example, to the screen member 30 not existing on the screen 10. However, there may be a circumstance wherein there is a different type of screen member which is not a genuine screen member 30. In such a case, the electronic apparatus 100 may project a text notifying that there is a different type of screen member which is not a genuine product.

FIG. 21 is a diagram illustrating an example operation of identifying the screen member 30 according to various embodiments.

Referring to FIG. 21, the screen member 30 may include a general area 2111 and a bumpy area 2112. The general area 2111 may be an area including a plane having a regular reflection rate. The bumpy area 2112 may be an area including a surface of which reflection rate varies. In the general area 2111, the reflection rate of light is regular, but in the bumpy area 2112, the reflection rate may not be regular. The bumpy area 2112 may, for example, be an area manufactured with intaglio (engraving) or relief (embossing). The bumpy area 2112 may be a predetermined (e.g., specified) object. If the predetermined object (the bumpy area 2112) is included in the acquired first photographed image, the electronic apparatus 100 may determine that the screen member 30 is a genuine product.

In FIG. 21, the bumpy area 2112 is indicated with slashes, but in actual implementation, the bumpy area 2112 may be an area that is not recognized by a user's vision in a general situation, but may be recognized by a user's vision limited to a situation wherein light is irradiated. The bumpy area 2112 may be implemented as an uneven surface, and thus the reflection rate of light may not be regular.

FIG. 22 is a diagram illustrating an example operation of identifying the screen member 30 according to various embodiments.

Referring to FIG. 22, the screen member 30 may include a predetermined (e.g., specified) object 2210. The predetermined object 2210 may refer, for example, to an object that can indicate a genuine screen member. For example, the predetermined object 2210 may include, for example, at least one of a predetermined text, a predetermined image, a predetermined icon, or a predetermined pattern. The predetermined object 2210 may be an object that is not seen well in a state wherein light is not irradiated, but that is seen well in a state wherein light is irradiated.

Figure 23:
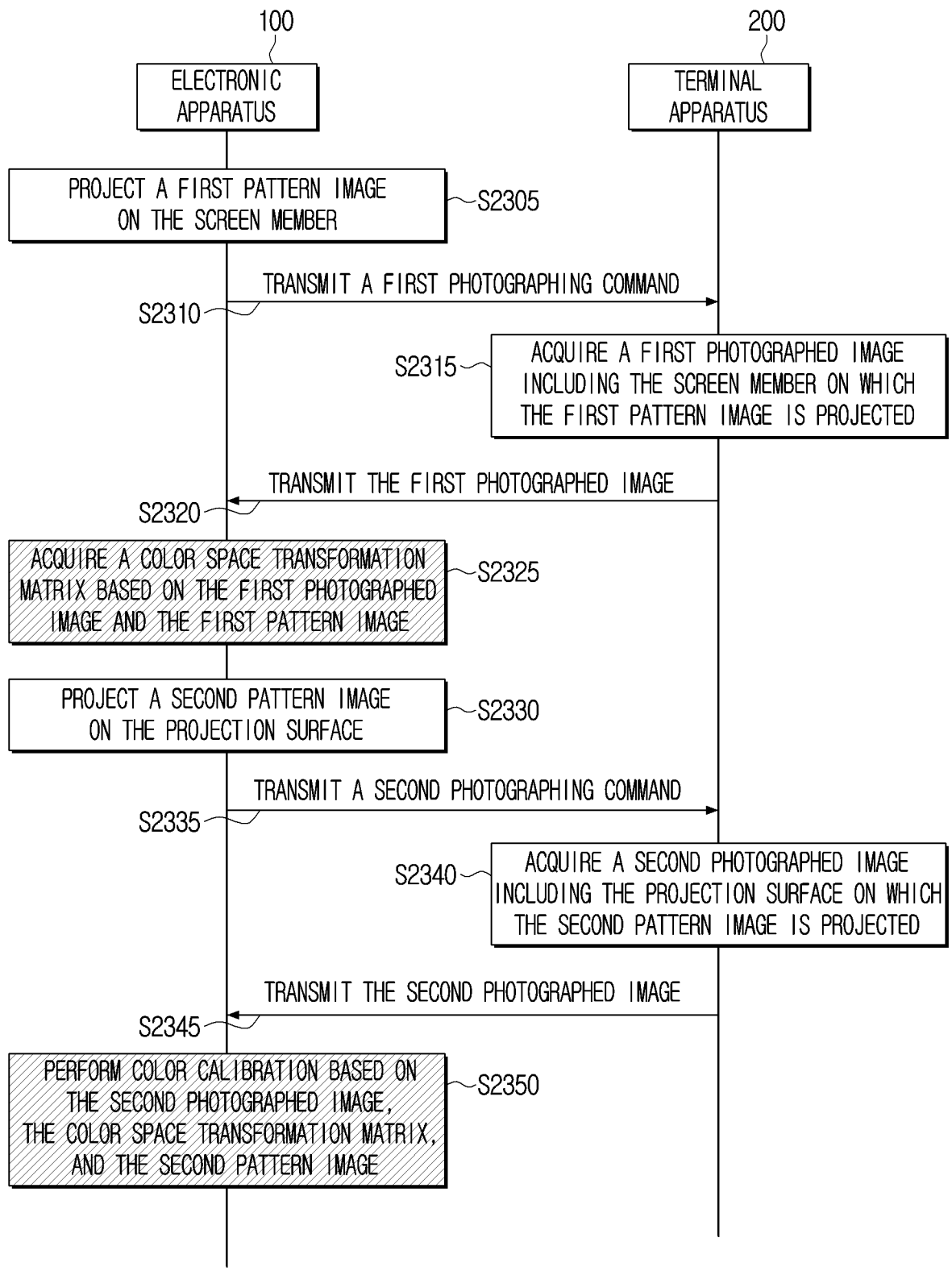
FIG. 23 is a signal flow diagram illustrating an example of performing a color calibrating operation in an electronic apparatus according to various embodiments.

FIG. 23 is a signal flow diagram illustrating an example operation of performing a color calibrating in the electronic apparatus 100 according to various embodiments.

Referring to FIG. 23, the electronic apparatus 100 may perform color calibration by acquiring a color space transformation matrix. For example, the electronic apparatus 100 may project the first pattern image on the screen member 30 in operation S2305. The electronic apparatus 100 may transmit a first photographing command to the terminal apparatus 200 in operation S2310. In case the user directly performs a photographing behavior after watching that the first pattern image is projected, the operation S2310 may be omitted.

After the first pattern image is projected, the terminal apparatus 200 may acquire a first photographed image including the screen member 30 on which the first pattern image is projected in operation S2315. The terminal apparatus 200 may transmit the first photographed image to the electronic apparatus 100 in operation S2320.

The electronic apparatus 100 may acquire a color space transformation matrix based on the first photographed image received from the terminal apparatus 200 and the first pattern image in operation S2325. For example, the electronic apparatus 100 may acquire a color space transformation matrix based on RGB information corresponding to the first photographed image and color space information corresponding to the first pattern image.

After acquiring the color space transformation matrix, the electronic apparatus 100 may project the second pattern image on the screen 10 in operation S2330. After projecting the second pattern image, the electronic apparatus 100 may transmit a second photographing command to the terminal apparatus 200 in operation S2335. In case the user directly performs a photographing behavior after watching that the second pattern image is projected, the operation S2335 may be omitted.

After the second pattern image is projected, the terminal apparatus 200 may acquire a second photographed image including the screen 10 on which the second pattern image is projected in operation S2340. The terminal apparatus 200 may transmit the second photographed image to the electronic apparatus 100 in operation S2345.

The electronic apparatus 100 may perform color calibration based on the second photographed image received from the terminal apparatus 200, the color space transformation matrix, and the second pattern image in operation S2350. For example, the electronic apparatus 100 may change RGB information corresponding to the second photographed image to color space information corresponding to the second photographed image based on the color space transformation matrix. The electronic apparatus 100 may perform color calibration based on a color difference between the color space information corresponding to the second photographed image and the color space information corresponding to the second pattern image.

Figure 24:
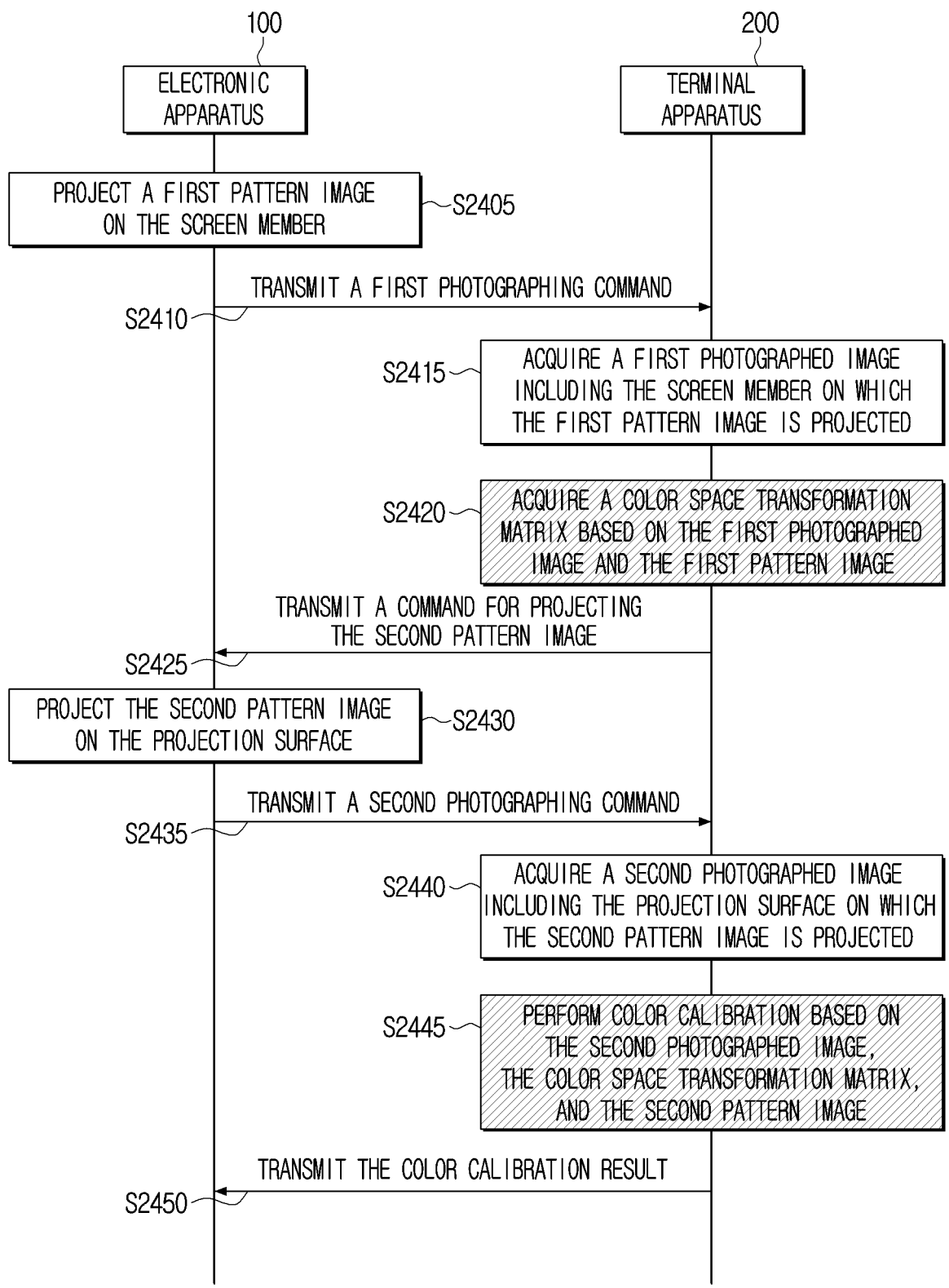
FIG. 24 is a signal flow diagram illustrating an example of performing a color calibrating operation in a terminal apparatus according to various embodiments.

FIG. 24 is a signal flow diagram illustrating an example operation of performing color calibration in the terminal apparatus 200 according to various embodiments.

Referring to FIG. 24, the electronic apparatus 100 may perform color calibration by acquiring a color space transformation matrix. For example, the electronic apparatus 100 may project the first pattern image on the screen member 30 in operation S2405. After projecting the first pattern image, the electronic apparatus 100 may transmit a first photographing command to the terminal apparatus 200 in operation S2410. In case the user directly performs a photographing behavior after watching that the first pattern image is projected, the operation S2410 may be omitted.

After the first pattern image is projected, the terminal apparatus 200 may acquire a first photographed image including the screen member 30 on which the first pattern image is projected in operation S2415.

The terminal apparatus 200 may acquire a color space transformation matrix based on the first photographed image and the first pattern image in operation S2420. For example, the terminal apparatus 200 may acquire a color space transformation matrix based on RGB information corresponding to the first photographed image and color space information corresponding to the first pattern image. The color space information corresponding to the first pattern image may be information already stored in the terminal apparatus 200, or information transmitted together in the operation S2410. The terminal apparatus 200 may transmit a command for projecting the second pattern image to the electronic apparatus 100 in operation S2425.

If the command for projecting the second pattern image is received from the terminal apparatus 200, the electronic apparatus 100 may project the second pattern image on the screen 10 in operation S2430. After projecting the second pattern image, the electronic apparatus 100 may transmit a second photographing command to the terminal apparatus 200 in operation S2435. In case the user directly performs a photographing behavior after watching that the second pattern image is projected, the operation S2435 may be omitted.

After the second pattern image is projected, the terminal apparatus 200 may acquire a second photographed image including the screen 10 on which the second pattern image is projected in operation S2440.

The terminal apparatus 200 may perform color calibration based on the second photographed image, the color space transformation matrix, and the second pattern image in operation S2445. For example, the terminal apparatus 200 may change RGB information corresponding to the second photographed image to color space information corresponding to the second photographed image based on the color space transformation matrix. The terminal apparatus 200 may perform color calibration based on a color difference between the color space information corresponding to the second photographed image and the color space information corresponding to the second pattern image. The color space information corresponding to the second pattern image may be information already stored in the terminal apparatus 200, or information transmitted together in the operation S2435. The terminal apparatus 200 may transmit the color calibration result to the electronic apparatus 100 in operation 52450.

Other than in FIG. 24, both of the operation of acquiring a color space transformation matrix and the color calibrating operation described to be performed in the electronic apparatus 100 in the description of the disclosure may be performed in the terminal apparatus 200.

Figure 25:
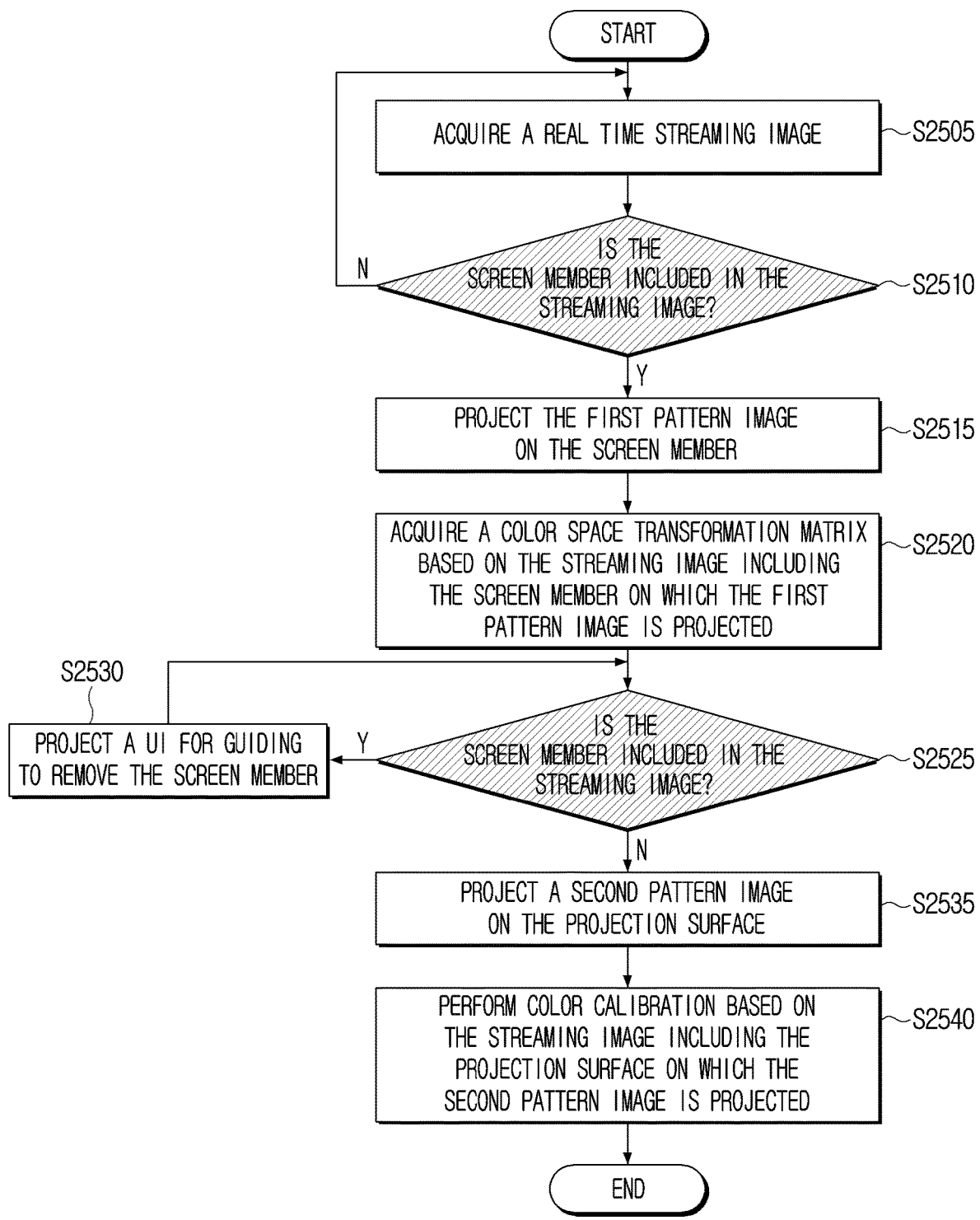
FIG. 25 is a flowchart illustrating an example of performing a color calibrating operation using streaming data according to various embodiments.

FIG. 25 is a flowchart illustrating an example operation of performing color calibrating using streaming data according to various embodiments.

Referring to FIG. 25, the electronic apparatus 100 may acquire an image including the screen member 30 or the screen 10 in real time. For example, the electronic apparatus 100 may acquire a real time streaming image corresponding to a space wherein the electronic apparatus 100 projects an image in operation 52505. The electronic apparatus 100 may identify whether the screen member 30 is included in the streaming image in operation S2510.

If the screen member 30 is not included in the streaming image in operation S2510—N, the electronic apparatus 100 may repeatedly acquire a streaming image. If the screen member 30 is included in the streaming image in operation S2510—Y, the electronic apparatus 100 may project the first pattern image on the screen member 30 in operation S2515.

The electronic apparatus 100 may acquire a color space transformation matrix based on the streaming image including the screen member 30 on which the first pattern image is projected in operation 52520. For example, the electronic apparatus 100 may acquire a color space transformation matrix based on RGB information corresponding to the streaming image including the screen member 30 and color space information corresponding to the first pattern image.

After acquiring the color space transformation matrix, the electronic apparatus 100 may identify whether the screen member 30 is included in the streaming image again in operation S2525.

If the screen member 30 is included in the streaming image after acquiring the color space transformation matrix in operation S2525—Y, the electronic apparatus 100 may project a UI for guiding to remove the screen member 30 in operation S2530. The electronic apparatus 100 may repeatedly identify whether the screen member 30 is included in the streaming image. If the screen member 30 is not included in the streaming image after acquiring the color space transformation matrix in operation S2525—N, the electronic apparatus 100 may project the second pattern image on the screen 10 in operation S2535.

The electronic apparatus 100 may perform color calibration based on the streaming image including the screen 10 on which the second pattern image is projected in operation S2540. For example, the electronic apparatus 100 may obtain RGB information corresponding to the streaming image including the screen 10 to color space information corresponding to the streaming image including the screen 10 based on the color space transformation matrix. The electronic apparatus 100 may perform color calibration based on a color difference between the color space information corresponding to the streaming image including the screen 10 and the color space information corresponding to the second pattern image.

Figure 26:
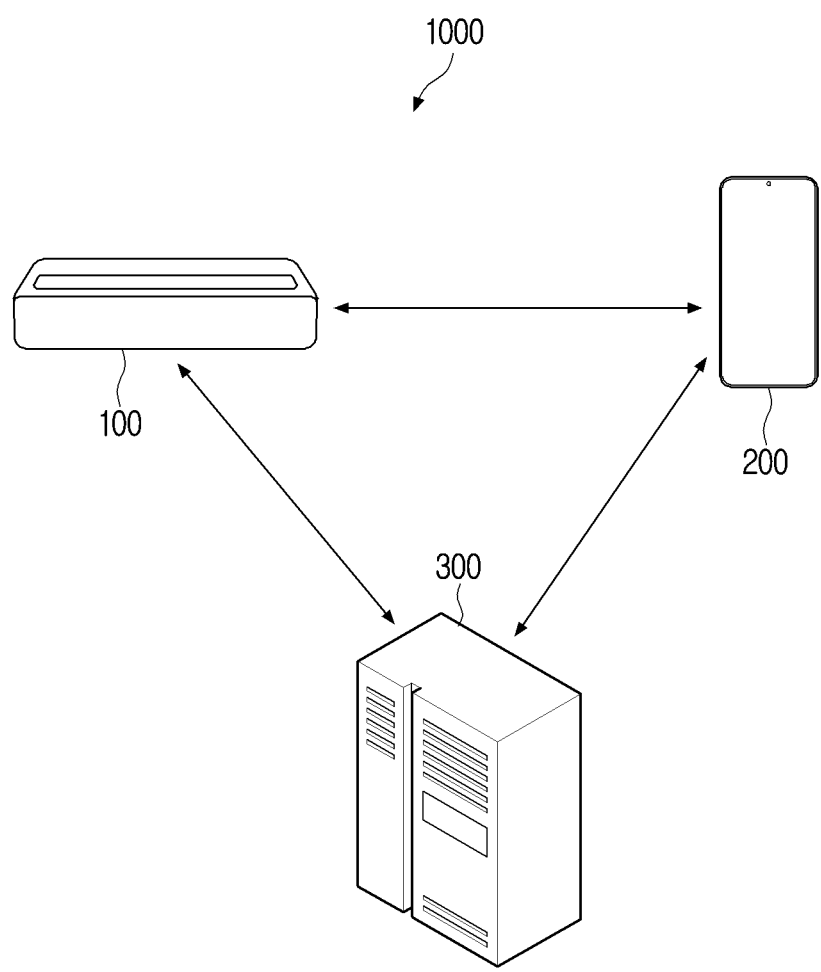
FIG. 26 is a diagram illustrating an example system including an electronic apparatus, a terminal apparatus, and a server according to various embodiments.

FIG. 26 is a diagram illustrating an example system including the electronic apparatus 100, the terminal apparatus 200, and the server 300 according to various embodiments.

Referring to FIG. 26, the server 300 may refer, for example, to an apparatus that can be communicatively connected with the electronic apparatus 100 and the terminal apparatus 200. The server 300 may transmit information necessary for the electronic apparatus 100 or the terminal apparatus 200.

According to an embodiment, the electronic apparatus 100 and the terminal apparatus 200 may directly transmit and receive information.

According to an embodiment, the electronic apparatus 100 and the terminal apparatus 200 may transmit and receive information through the server 300.

As an example, the terminal apparatus 200 may transmit a photographed image to the server 300, and the server 300 may transmit the image received from the terminal apparatus 200 to the electronic apparatus 100.

As another example, color calibration may be performed in the terminal apparatus 200 using the color space transformation matrix. The server 300 may transmit information related to the first pattern image and information related to the second pattern image to the terminal apparatus 200. The information related to the first pattern image may refer, for example, to color space information corresponding to the first pattern image. The information related to the second pattern image may refer, for example, to color space information corresponding to the second pattern image. The color calibration result generated by the terminal apparatus 200 may be transmitted to the server 300, and the server 300 may transmit the color calibration result received from the terminal apparatus 200 to the electronic apparatus 100.

FIG. 27 is a diagram illustrating an example process of acquiring a color space transformation matrix used in acquiring XYZ color space information corresponding to a photographed image according to various embodiments.

Referring to FIG. 27, 2700 describes a schematic process of acquiring a color space transformation matrix. The color space transformation matrix may refer, for example, a matrix for converting from RGB information into XYZ color space information. The matrix 2701 may refer, for example, to the color space transformation information or the color space transformation matrix. The matrix 2701 may refer, for example, to a 3*3 matrix.

The matrix 2701 may include nine unknowns. The nine unknowns may be KXR, KXG, KXB, KYR, KYG, KYB, KZR, KZG, and KZB. For acquiring correct values for the nine unknowns, the electronic apparatus 100 may use the three examples 2710, 2720, 2730. 2710 is an example of projecting a red pattern image, and then photographing the image, 2720 is an example of projecting a green pattern image, and photographing the image, and 2730 is an example of projecting a blue pattern image, and then photographing the image.

In 2710, the electronic apparatus 100 may project a red pattern image, and acquire a photographed image including the screen member 30 on which the red pattern image is projected. The electronic apparatus 100 may acquire RGB information corresponding to the red pattern image from the acquired photographed image. The matrix 2701 may refer, for example, to a color space transformation matrix, and it may refer, for example, to a 3*3 matrix having nine unknowns. The matrix 2712 may refer, for example, to RGB information corresponding to the photographed image including the screen member 30 on which the red pattern image is projected. The matrix 2713 may refer, for example, to XYZ color space information corresponding to the red pattern image. The matrix 2713 may be stored in the memory 110 in advance before acquiring the photographed image. Through 2710, three simultaneous equations related to the color space transformation matrix may be acquired.

In 2720, the electronic apparatus 100 may project a green pattern image, and acquire a photographed image including the screen member 30 on which the green pattern image is projected. The electronic apparatus 100 may acquire RGB information corresponding to the green pattern image from the acquired photographed image. The matrix 2701 may refer, for example, to a color space transformation matrix, and it may refer, for example, to a 3*3 matrix having nine unknowns. The matrix 2722 may refer, for example, to RGB information corresponding to the photographed image including the screen member 30 on which the green pattern image is projected. The matrix 2723 may refer, for example, to XYZ color space information corresponding to the green pattern image. The matrix 2723 may be stored in the memory 110 in advance before acquiring the photographed image. Through 2720, three simultaneous equations related to the color space transformation matrix may be acquired.

In 2730, the electronic apparatus 100 may project a blue pattern image, and acquire a photographed image including the screen member 30 on which the blue pattern image is projected. The electronic apparatus 100 may acquire RGB information corresponding to the blue pattern image from the acquired photographed image. The matrix 2701 may refer, for example, to a color space transformation matrix, and it may refer, for example, to a 3*3 matrix having nine unknowns. The matrix 2732 may refer, for example, to RGB information corresponding to the photographed image including the screen member 30 on which the blue pattern image is projected. The matrix 2733 may refer, for example, to XYZ color space information corresponding to the blue pattern image. The matrix 2733 may be stored in the memory 110 in advance before acquiring the photographed image. Through 2730, three simultaneous equations related to the color space transformation matrix may be acquired.

The electronic apparatus 100 may acquire nine simultaneous equations through the three kinds of embodiments 2710, 2720, 2730, and find all of the nine unknowns included in the color space transformation matrix using the nine simultaneous equations. Ultimately, the electronic apparatus 100 may acquire a color space transformation matrix of a 3*3 matrix.

In FIG. 27, a 3*3 matrix was acquired for acquiring a color space transformation matrix corresponding to the embodiment of using XYZ color space information in RGB information. However, depending on implementation examples, various kinds of color space information may be used other than XYZ color space information. Depending on implementation examples, the electronic apparatus 100 may acquire a color space transformation matrix in a different size other than a 3*3 matrix.

Figure 28:
FIG. 28 is a diagram illustrating RGB information corresponding to a photographed image and XYZ color space information corresponding to a photographed image according to various embodiments.

FIG. 28 is a diagram illustrating RGB information corresponding to a photographed image and XYZ color space information corresponding to a photographed image according to various embodiments.

Referring to FIG. 28, the electronic apparatus 100 may transform RGB information corresponding to a photographed image into XYZ color space information. For example, the electronic apparatus 100 may acquire XYZ color space information by multiplying RGB information corresponding to a photographed image with a color space transformation matrix. The table 2810 may indicate the RGB information, and the table 2820 may indicate the color space transformation information.

FIG. 29 is a flowchart illustrating an example method of controlling an electronic apparatus according to various embodiments.

A method of controlling the electronic apparatus 100 that can store a first pattern image and a second pattern image and that communicates with an external terminal apparatus according to an example embodiment of the disclosure includes: projecting a first pattern image on a screen member 30 located on a projection surface (S2905), and based on receiving a first photographing image which photographed the screen member 30 from the external terminal apparatus, acquiring transformation information based on the first photographed image and the first pattern image (S2910), projecting a second pattern image on the projection surface (S2915), and based on receiving a second photographed image which photographed the projection surface from the external terminal apparatus, performing color calibration according to the characteristic of the projection surface based on the second photographed image, the second pattern image, and the transformation information (S2920).

The transformation information may be color space transformation information, and in the step of acquiring the transformation information (S2910), color space information corresponding to the first pattern image may be acquired, and the color space transformation information according to the characteristic of a projection part 120 included in the electronic apparatus 100 may be acquired based on the first photographed image and the color space information corresponding to the first pattern image.

In the operation of performing the color calibration (S2920), color space information corresponding to the second pattern image may be acquired, and color calibration according to the characteristic of the projection surface may be performed based on the second photographed image, the color space information corresponding to the second pattern image, and the color space transformation information.

In the operation of acquiring the transformation information (S2910), the color space transformation information may be acquired based on RGB information corresponding to the first photographed image and XYZ color space information corresponding to the first pattern image.

The transformation information may be a color space transformation matrix transforming the RGB information into the XYZ color space information.

In the operation of performing the color calibration (S2920), the RGB information corresponding to the second photographed image may be transformed into the XYZ color space information based on the transformation information, a color difference between the XYZ color space information corresponding to the second photographed image and the XYZ color space information corresponding to the second pattern image may be acquired, and the color calibration may be performed based on the acquired color difference.

In the operation of performing the color calibration (S2920), at least one of a gain value or an offset value related to an RGB signal may be acquired based on the acquired color difference.

The method may further include: based on identifying that a predetermined object related to the screen member 30 is included in the first photographed image, acquiring the transformation information based on the first photographed image and the first pattern image, and based on identifying that a specified object related to the screen member 30 is not included in the first photographed image, projecting a UI including information that the screen member 30 is not recognized.

The first pattern image may include at least one of a white pattern image, a red pattern image, a green pattern image, or a blue pattern image, and the second pattern image may include a white pattern image.

In the operation of projecting the first pattern image (S2905), the white pattern image among the plurality of pattern images included in the first pattern image may be projected first, and the remaining pattern images may be sequentially projected.

The first pattern image may include at least one of a red pattern, a green pattern, a blue pattern, or a white pattern. Here, the electronic apparatus 100 may output the white pattern first. The electronic apparatus 100 may output the red, green, and blue patterns. If the white pattern is output first, the order of the red, green, and blue patterns after than may vary according to the user setting.

The screen member 30 may, for example, be a white screen member. As an example, the screen member 30 may be a material such as plastic, etc., and it may be a flat material that can be attached to or mounted on the projection surface as describe by way of example above with reference to FIG. 5 and FIG. 7. As another example, a part of the electronic apparatus 100 may be designed to be utilized as the screen member. The screen member 30 may be a mechanical part or a panel, and it may be a partial component of the electronic apparatus 100 as described by way of example above with reference to FIG. 6, FIG. 8, and FIG. 10.

The rim of the screen member 30 may have been designed in a pattern having a reflection rate that is different as much as the thickness and/or the depth defined by the manufacturer. Accordingly, when a specific light is projected on the screen member 30 from the projection part, the reflection rate of the rim and the reflection rates of the other areas may be different. Accordingly, in case the screen member 30 is photographed by the camera, the gradation (the brightness or the color) may be recognized differently depending on the areas of the screen member 30.

The pattern having a different reflection rate may be designed such that it is recognized well in case a light having directivity is projected as the electronic apparatus 100, but is difficult to be distinguished under a general natural light or an indoor lamp. By such a method, a specific shape or letter may be imprinted, and may be recognized when photographed by the camera.

A user may position the screen member 30 provided when purchasing the electronic apparatus 100 in a location that an output image is projected, and positions the screen member 30 such that an entire output image or a portion of an output image is projected on the screen member 30. For identifying the screen member defined by the manufacturer, the electronic apparatus 100 may identify with the naked eye by projecting a pattern or a light defined in advance, or for automation, the electronic apparatus 100 may provide a calibration function such that, if the screen member is photographed by the camera provided on the electronic apparatus 100 or a smartphone camera, the calibration function is operated when the screen member is recognized.

According to an embodiment, a pre-calibrating operation may be performed as a menu provided at the electronic apparatus 100 is selected. The pre-calibrating operation may include operations of communicatively connecting the electronic apparatus 100 projecting an image and a terminal apparatus 200, and adjusting the sensitivity of the projection part 120.

If a pre-calibration menu among SW OSD menus of the electronic apparatus 100 is selected, the electronic apparatus 100 may find a user terminal apparatus 200 on which a camera is mounted in the surroundings, and output a list. If a user selects a specific device, the electronic apparatus 100 may output a message attempting connection to the specific device, and wait for acceptance (or selection) of the user. The electronic apparatus 100 may automatically find surrounding devices through methods such as WiFi, UPNP, etc., and output a list. Here, the list may include at least one of device names, device IDs, or device shapes that iconized schematic shapes of devices. When a specific device is selected by the user, the electronic apparatus 100 may set paring connection temporarily, and output an image indicating which is the device that the user currently selected (for which the color calibrating function will be performed).

If the device is not the device wanted by the user, the electronic apparatus 100 may release the temporary connection and may output the list again, and may output a guide image so that the user can select the connected device again. The electronic apparatus 100 may output information related to the device of which connection was released in a gray color, so that the device of which connection was released is not selected again. By displaying surrounding devices by distinguishing colors, the user can easily distinguish and display surrounding devices that can be connected with the electronic apparatus 100.

When the user selects one device, one between the electronic apparatus 100 and the selected device may become an access point (AP) and paring may be operated, and it may become a state wherein wireless communication between the electronic apparatus 100 and the selected device is possible. The electronic apparatus 100 may store the name or the physical address, etc. of the paired device, and may use the stored information again when pairing is needed again later. As connection information is stored, the electronic apparatus 100 may provide an automatic connecting function that can shorten the time for the user to select.

According to an embodiment, the pre-color calibrating function may be performed as a menu provided at the terminal apparatus 200 is selected.

If a pre-calibration menu provided at an application of the terminal apparatus 200 is selected, the terminal apparatus 200 may find surrounding devices that can be communicatively connected with the terminal apparatus 200, and display subjects having a projection function in the terminal apparatus 200 as a list. The user may select a specific device in the list displayed through the terminal apparatus 200. The list may include at least one of device names, device IDs, or thumbnails of images that are being reproduced (or output) in the surrounding devices.

If one surrounding device is selected in the list, one between the terminal apparatus 200 and the selected device may become an access point (AP) and paring may be operated, and it may become a state wherein wireless communication between the terminal apparatus 200 and the selected device is possible. Here, the terminal apparatus 200 may store the name or the physical address, etc. of the paired device, and may use the stored information again when pairing is needed again later. As connection information is stored, the terminal apparatus 200 may provide an automatic connecting function that can shorten the time for the user to select.

The pre-calibration may be a process of matching the display and the calibration reference point for resolving the problems of calibration precision and distribution due to procedural distribution of various cell phone cameras. Through this, the problem of procedural distribution of various smartphone cameras can be resolved.

An embodiment wherein a color calibrating operation is performed in the terminal apparatus 200 is assumed. The electronic apparatus 100 may change the patterns of red, green, and blue and output the patterns on the screen member 30, and transmit a signal (flag) for photographing an image to the terminal apparatus 200. Also, the terminal apparatus 200 may analyze the photographed image, and transmit picture quality adjustment information according to the analysis result and a signal (flag) for changing to the next pattern to the electronic apparatus 100. After the terminal apparatus 200 photographed the red pattern output by the electronic apparatus 100, the red, green, and blue wavelength information may be extracted from the acquired image and stored. Likewise, after the terminal apparatus 200 photographed the green and blue patterns output by the electronic apparatus 100, the respective red, green, and blue wavelength information may be analyzed from the acquired image and stored. The white pattern may be analyzed and stored. By combining the pattern photographing analysis information and the R/G/B reaction characteristics of the camera included in the terminal apparatus 200, the terminal apparatus 200 may generate a color space transformation matrix for precise RGB to XYZ color domain transformation. The color space transformation matrix may be used in color space transformation for optical color coordinate adjustment from the RGB information of the image photographed by the camera of the terminal apparatus 200.

Even if the actual color of the screen is different, the electronic apparatus 100 or the terminal apparatus 200 may automatically calibrate the color to the picture quality of the original image or the picture quality set by the user.

If communicative connection is set between the terminal apparatus 200 and the electronic apparatus 100, the color calibrating function may be performed immediately without a need to select a device separately.

In case only a color space transformation matrix was generated in the previous process, and the color calibrating operation was not completed, an operation for connecting the electronic apparatus 100 and the terminal apparatus 200 may be performed. If a specific menu is selected by the user, a list may be output through the electronic apparatus 100, or a list may be output through an application of the terminal apparatus 200.

If a specific menu is selected at the electronic apparatus 100 or the terminal apparatus 200 after communicative connection is set, the electronic apparatus 100 may perform the color calibrating function.

In case the electronic apparatus 100 utilizes a wall surface having a specific color as the screen 10, the color calibrating function may be needed. Specifically, the electronic apparatus 100 may project the white pattern on the screen member 30, and when projection is completed, the electronic apparatus 100 may give a flag, and transmit a signal for photographing to the terminal apparatus 200. After the terminal apparatus 200 photographed the white pattern output from the electronic apparatus 100 and reflected on the wall surface, the color calibrating function may be performed by utilizing only the information of a pre-defined operation area (e.g., N×N pixels in the center of the image) among the entire areas of the RGB image.

The electronic apparatus 100 may transform the RGB information of the photographed image into XYZ color space information by utilizing the color space transformation matrix, and then calculate a color coordinate. Here, it may be analyzed how much difference the calculated color coordinate has from the target color coordinate to be adjusted through the color calibrating function. The electronic apparatus 100 may calculate a signal change (adjustment) value for calibration of the color coordinate, and inverse-transform the color coordinate calibration value in this XYZ color space into the RGB color space again (it can be calculated as an inverse-transformation matrix of the transformation matrix), and calculate the RGB calibration value. The electronic apparatus 100 may adjust the output signal level by utilizing a gain and/or an offset for the RGB signal. At the time point when an error becomes smaller than or equal to a predetermined threshold value by repetitively performing this process, the calibration process may be completed.

An embodiment wherein a color calibrating operation is performed in the terminal apparatus 200 is assumed. The electronic apparatus 100 may output the white pattern, and give a flag for photographing to the terminal apparatus 200. When the terminal apparatus 200 completes photographing and analysis, the terminal apparatus 200 may transmit the result value that it analyzed and a flag for changing to the next pattern to the electronic apparatus 100.

An embodiment wherein a color calibrating operation is performed in the electronic apparatus 100 is assumed. The camera of the terminal apparatus 200 may transmit photographed RGB information to the electronic apparatus 100, and the electronic apparatus 100 may perform all of color space transformation, calculation of an RGB signal output adjustment value, and adjustment. For this, the color space transformation matrix acquired in the pre-calibration step may be stored in the electronic apparatus 100, and it may then be shared to the terminal apparatus 200, or vice versa. The color space transformation matrix may be kept in the server 300, and may be downloaded immediately on a needing side and used.

In the case of performing the color calibrating function, the electronic apparatus 100 may calculate only the operation area of the RGB image (the central N×N pixels of the RGB image) acquired by the camera of the terminal apparatus 200, and perform color calibration based on the central area, for example. As another example, the electronic apparatus 100 may divide the acquired RGB image into rectangular areas in X and Y numbers respectively in horizontal and vertical directions, and respectively extract n×n pixels in the centers of the X×Y rectangular areas. The electronic apparatus 100 may transform these into XYZ color spaces respectively, and compare the color coordinates in the X×Y number and the color coordinate of the central area of the RGB image, and calibrate color non-uniformity on the wall surface at the same time. For example, the electronic apparatus 100 may calculate the deviation between the color coordinate of the central area and the color coordinates of the surrounding areas, and calculate the non-uniformity characteristic of the projected wall surface. When performing signal adjustment in the electronic apparatus 100, the electronic apparatus 100 may perform calibration through a process of mis-adjusting so that uniformity of the RGB signal can be matched as it proceeds more to the outside based on the center of the wall surface. When uniform optical signal information projected from the electronic apparatus 100 is reflected on the wall surface that the user is going to project and recognized by the eyes of the user, the color non-uniformity of the wall surface can be adjusted precisely.

The performing of an operation process by the terminal apparatus 200 or by the electronic apparatus 100 as above may be changed to a method of completely changing the roles of each other automatically or by dividing some of the process and processing them, etc. under the determination by the terminal apparatus 200 or the electronic apparatus 100 in consideration of the processing power between the two apparatuses. Also, such distribution of roles may be implemented in a form of being selected by the user, so that it may be fixed as an option or changed flexibly.

In a process of initially photographing and analyzing, the electronic apparatus 100 may output a result image indicating to which level the wall surface can be calibrated precisely by the wall color calibrating function aimed to be provided in the disclosure. Here, the result image may include a UI notifying a processing result of the logic inside the product and the pre-determined rules. The electronic apparatus 100 may measure the color of the wall surface, and project the white pattern on the wall surface of the current level. Then, the electronic apparatus 100 may analyze the photographing result and calculate a signal change range (e.g., min, max) that can be adjusted at the electronic apparatus 100, and calculate how precisely the wall surface can be adjusted. In case the precision is lower than the minimum level that is aimed to be provided by the disclosure according to the measurement result of the signal processing, the electronic apparatus 100 may output at least one of a warning image, or a guide for the precision. The electronic apparatus 100 may provide an operation of identifying whether the user will proceed with calibration or stop calibration after providing the guide for the predicted precision of calibration.

Even if the color of the projection surface has a specific color which is not a white color through this process, precise adjustment to the color coordinate of the intended XYZ color space is possible. Although calibration of the color on the previous RGB color space is different from the recognized color, adjustment wherein the color seems to be the same color as that of the original image such as a white screen is possible through the method of calibrating the color by utilizing the XYZ space according to the disclosure. After adjustment is completed, the electronic apparatus 100 may display the change of the adjusted picture quality before the adjustment and after the adjustment. Then, the electronic apparatus 100 may provide a UI so that the user can select the setting before the adjustment or after the adjustment.

If the setting is finally selected by the user, the electronic apparatus 100 may store the setting value. In case the electronic apparatus 100 is used on the same wall surface later, the electronic apparatus 100 may call the stored setting value again and use it. The setting value may be implemented in a form of being stored in the terminal apparatus 200 or the server 300 other than the electronic apparatus 100.

The electronic apparatus 100 may store information on a wall surface of which picture quality was adjusted (information that can specify the wall surface in an adjustment process such as the location in a home, the measured color distribution when projecting a white pattern on the wall surface from a projector, etc.), and easily apply the information in a situation wherein a user uses a portable projector which is convenient to carry.

The electronic apparatus 100 can provide the picture quality of an original image without a change regardless of which material or a color of a screen. Accordingly, functionality or usability of a projector can be improved.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
   memory storing a first pattern image and a second pattern image;
   a communication interface comprising communication circuitry configured to communicate with an external terminal apparatus;
   a projector; and
   at least one processor configured to:
      control the projector to project the first pattern image on a screen member overlaid onto at least a portion of a projection surface, wherein the screen member comprises a white reflector which is separate from the projection surface,
      receive a first photographed image which includes the screen member on which the first pattern image is projected from the external terminal apparatus through the communication interface,
      acquire color space transformation information based on the first photographed image and color space information corresponding to the first pattern image,
      control the projector to project the second pattern image on the projection surface without the screen member being overlaid,
      receive a second photographed image which includes the projection surface without the screen member being overlaid on which the second pattern image is projected from the external terminal apparatus through the communication interface, and
      perform color calibration of an image to be projected on the projection surface according to a characteristic of the projection surface based on the second photographed image, color space information corresponding to the second pattern image, and the color space transformation information.

2. The electronic apparatus of claim 1,
   wherein the at least one processor is configured to:
      acquire the color space transformation information based on red, green blue (RGB) information corresponding to the first photographed image and XYZ color space information corresponding to the first pattern image.

3. The electronic apparatus of claim 1,
   wherein the color space transformation information comprises a color space transformation matrix transforming RGB information into XYZ color space information.

4. The electronic apparatus of claim 1,
   wherein the at least one processor is configured to:
      transform RGB information corresponding to the second photographed image into XYZ color space information based on the color space transformation information,
      acquire a color difference between the XYZ color space information corresponding to the second photographed image and XYZ color space information corresponding to the second pattern image, and perform the color calibration based on the acquired color difference.

5. The electronic apparatus of claim 4,
wherein the at least one processor is configured to:
change at least one of a gain value or an offset value related to an RGB signal based on the acquired color difference.

6. The electronic apparatus of claim 1,
wherein the at least one processor is configured to:
based on identifying that a predetermined object related to the screen member is included in the first photographed image, acquire the color space transformation information based on the first photographed image, and
based on identifying that a predetermined object related to the screen member is not included in the first photographed image, control the projector to project a user interface (UI) including information that the screen member is not recognized.

7. The electronic apparatus of claim 1,
wherein the first pattern image includes at least one of a white pattern image, a red pattern image, a green pattern image, or a blue pattern image, and
the second pattern image includes a white pattern image.

8. The electronic apparatus of claim 7,
wherein the at least one processor is configured to:
control the projector to project the white pattern image included in the first pattern image first, and project remaining pattern images sequentially.

9. A method of controlling an electronic apparatus storing a first pattern image and a second pattern image and communicating with an external terminal apparatus, the method comprising:
projecting the first pattern image on a screen member overlaid onto at least a portion of a projection surface, wherein the screen member comprises a white reflector which is separate from the projection surface;
receiving a first photographed image which includes the screen member on which the first pattern image is projected from the external terminal apparatus;
acquiring color space transformation information based on the first photographed image and color space information corresponding to the first pattern image;
projecting the second pattern image on the projection surface without the screen member being overlaid;
receiving a second photographed image which includes the projection surface without the screen member being overlaid on which the second pattern image is projected from the external terminal apparatus; and
performing color calibration of an image to be projected on the projection surface according to a characteristic of the projection surface based on the second photographed image, color space information corresponding to the second pattern image, and the color space transformation information.

10. The method of claim 9,
wherein the acquiring the transformation information comprises:
acquiring the color space transformation information based on red green blue (RGB) information corresponding to the first photographed image and XYZ color space information corresponding to the first pattern image.

11. The method of claim 9,
wherein the color space transformation information is a color space transformation matrix transforming RGB information into XYZ color space information.

12. The method of claim 9,
wherein the performing the color calibration comprises:
transforming RGB information corresponding to the second photographed image into XYZ color space information based on the color space transformation information,
acquiring a color difference between the XYZ color space information corresponding to the second photographed image and XYZ color space information corresponding to the second pattern image, and
performing the color calibration based on the acquired color difference.

13. The method of claim 12,
wherein the performing the color calibration comprises:
changing at least one of a gain value or an offset value related to an RGB signal based on the acquired color difference.

14. The method of claim 9, further comprising:
based on identifying that a predetermined object related to the screen member is included in the first photographed image, acquiring the color space transformation information based on the first photographed image, and
based on identifying that a predetermined object related to the screen member is not included in the first photographed image, projecting a user interface (UI) including information that the screen member is not recognized.

15. The method of claim 9,
wherein the first pattern image includes at least one of a white pattern image, a red pattern image, a green pattern image, or a blue pattern image, and
the second pattern image includes a white pattern image.

16. The method of claim 15,
wherein the projecting the first pattern image comprises:
projecting the white pattern image included in the first pattern image first, and projecting remaining pattern images sequentially.

* * * * *